(12) United States Patent
Hsu et al.

(10) Patent No.: US 7,177,798 B2
(45) Date of Patent: Feb. 13, 2007

(54) NATURAL LANGUAGE INTERFACE USING CONSTRAINED INTERMEDIATE DICTIONARY OF RESULTS

(75) Inventors: Cheng Hsu, Latham, NY (US); Veera Boonjing, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 578 days.

(21) Appl. No.: 09/861,860

(22) Filed: May 21, 2001

(65) Prior Publication Data
US 2002/0059069 A1 May 16, 2002

Related U.S. Application Data

(63) Continuation-in-part of application No. 09/544,676, filed on Apr. 17, 2000, now abandoned.

(60) Provisional application No. 60/205,725, filed on May 19, 2000.

(51) Int. Cl.
*G06F 17/27* (2006.01)

(52) U.S. Cl. .............................. 704/9; 704/10; 706/11; 706/45

(58) Field of Classification Search ............ 704/270.1, 704/9, 7, 201, 10; 706/45, 11, 927, 55; 707/2–9, 707/104.1; 715/762, 709
See application file for complete search history.

(56) References Cited

U.S. PATENT DOCUMENTS

| | | | |
|---|---|---|---|
| 5,047,614 A | | 9/1991 | Bianco |
| 5,057,915 A | | 10/1991 | Von Kohorn |
| 5,412,804 A | * | 5/1995 | Krishna .................. 707/2 |
| 5,412,806 A | * | 5/1995 | Du et al. .................. 707/2 |
| 5,418,951 A | * | 5/1995 | Damashek .................. 707/5 |
| 5,471,611 A | * | 11/1995 | McGregor .................. 707/4 |
| 5,493,677 A | * | 2/1996 | Balogh et al. ............ 707/104.1 |
| 5,537,618 A | | 7/1996 | Boulton et al. |
| 5,578,808 A | | 11/1996 | Taylor |
| 5,596,994 A | | 1/1997 | Bro |
| 5,644,727 A | | 7/1997 | Atkins |
| 5,696,962 A | | 12/1997 | Kupiec |
| 5,701,400 A | * | 12/1997 | Amado .................... 706/45 |
| 5,706,442 A | | 1/1998 | Anderson et al. |
| 5,710,886 A | | 1/1998 | Christensen et al. |
| 5,721,827 A | | 2/1998 | Logan et al. |
| 5,749,081 A | | 5/1998 | Whiteis |

(Continued)

FOREIGN PATENT DOCUMENTS

CH      681 573 A5     4/1993

(Continued)

OTHER PUBLICATIONS

International Search Report from International Patent Application PCT/US00/09265, filed Apr. 7, 2000.

(Continued)

*Primary Examiner*—Vijay B. Chawan
(74) *Attorney, Agent, or Firm*—Wolf, Greenfield & Sacks, P.C.

(57) ABSTRACT

A method for processing a natural language input provided by a user includes: providing a natural language query input to the user; performing, based on the input, a search of one or more language-based databases; providing, through a user interface, a result of the search to the user; identifying, for the one or more language-based databases, a finite number of database objects; and determining a plurality of combinations of the finite number of database objects. The one or more language-based databases include at least one metadata database including at least one of a group of information types including case information, keywords, information models, and database values.

21 Claims, 18 Drawing Sheets

U.S. PATENT DOCUMENTS

| | | | |
|---|---|---|---|
| 5,759,101 | A | 6/1998 | Von Kohorn |
| 5,794,050 | A | 8/1998 | Dahlgren et al. |
| 5,794,207 | A | 8/1998 | Walker et al. |
| 5,794,237 | A * | 8/1998 | Gore, Jr. .................. 704/7 |
| 5,825,881 | A | 10/1998 | Colvin, Sr. |
| 5,845,255 | A | 12/1998 | Mayaud |
| 5,857,184 | A * | 1/1999 | Lynch .................. 707/4 |
| 5,862,223 | A | 1/1999 | Walker et al. |
| 5,864,844 | A * | 1/1999 | James et al. .................. 704/9 |
| 5,875,437 | A | 2/1999 | Atkins |
| 5,884,323 | A | 3/1999 | Hawkins et al. |
| 5,895,464 | A * | 4/1999 | Bhandari et al. .................. 707/3 |
| 5,930,769 | A | 7/1999 | Rose |
| 5,933,822 | A * | 8/1999 | Braden-Harder et al. ...... 707/5 |
| 5,940,811 | A | 8/1999 | Norris |
| 5,941,944 | A | 8/1999 | Messerly |
| 5,948,040 | A | 9/1999 | DeLorme et al. |
| 5,956,699 | A | 9/1999 | Wong et al. |
| 5,963,924 | A | 10/1999 | Williams et al. |
| 5,963,926 | A | 10/1999 | Kumomura |
| 5,970,474 | A | 10/1999 | LeRoy et al. |
| 5,974,146 | A | 10/1999 | Randle et al. |
| 5,982,891 | A | 11/1999 | Ginter et al. |
| 5,987,132 | A | 11/1999 | Rowney |
| 5,987,140 | A | 11/1999 | Rowney et al. |
| 5,987,440 | A | 11/1999 | O'Neil et al. |
| 5,999,908 | A | 12/1999 | Abelow |
| 6,023,684 | A | 2/2000 | Pearson |
| 6,024,288 | A | 2/2000 | Gottlich et al. |
| 6,026,345 | A | 2/2000 | Shah et al. |
| 6,026,375 | A | 2/2000 | Hall et al. |
| 6,055,514 | A | 4/2000 | Wren |
| 6,070,147 | A | 5/2000 | Harms et al. |
| 6,076,088 | A * | 6/2000 | Paik et al. .................. 707/5 |
| 6,081,774 | A * | 6/2000 | de Hita et al. .................. 704/9 |
| 6,094,649 | A * | 7/2000 | Bowen et al. .................. 707/3 |
| 6,105,865 | A | 8/2000 | Hardesty |
| 6,119,101 | A | 9/2000 | Peckover |
| 6,125,356 | A | 9/2000 | Brockman et al. |
| 6,233,578 | B1 * | 5/2001 | Machihara et al. .......... 707/10 |
| 6,260,024 | B1 | 7/2001 | Shkedy |
| 6,275,824 | B1 | 8/2001 | O'Flaherty et al. |
| 6,356,905 | B1 | 3/2002 | Gershman et al. |
| 6,505,175 | B1 | 1/2003 | Silverman et al. |
| 6,505,183 | B1 * | 1/2003 | Loofbourrow et al. ........ 706/45 |
| 6,546,388 | B1 * | 4/2003 | Edlund et al. .................. 707/5 |
| 6,556,983 | B1 * | 4/2003 | Altschuler et al. ............ 706/55 |
| 6,625,583 | B1 | 9/2003 | Silverman et al. |
| 6,711,585 | B1 * | 3/2004 | Copperman et al. ..... 707/104.1 |
| 6,718,324 | B2 * | 4/2004 | Edlund et al. .................. 707/5 |
| 6,766,320 | B1 * | 7/2004 | Wang et al. .................. 707/5 |
| 2002/0087578 | A1 * | 7/2002 | Vroman .................. 707/104.1 |
| 2004/0236778 | A1 * | 11/2004 | Junqua et al. .............. 707/100 |

FOREIGN PATENT DOCUMENTS

| | | |
|---|---|---|
| EP | 0 863 453 A1 | 9/1998 |
| WO | WO 97/26612 A1 | 7/1997 |
| WO | WO 98/41956 A1 | 9/1998 |
| WO | WO 99/01834 A1 | 1/1999 |
| WO | WO 99/08238 A1 | 2/1999 |

OTHER PUBLICATIONS

Burns et al., "Development of a Web-Based Intelligent Agent for the Fashion Selection and Purchasing Process via Electronic Commerce," Department of Administrative Sciences, Kent State University, pp. 140-142.

Decker et al., "Designing Behaviors for Information Agents," The Robotics Institute, Carnegie Mellon University, Jul. 5, 1996, pp. 1-15.

Decker et al., "Matchmaking and Brokering," The Robotics Institute, Carnegie-Mellon University, May 16, 1996, pp. 1-19.

Gregg, "DSS Access on the WWW: An Intelligent Agent Prototype," School of Accountancy and Information Systems, College of Business, Arizona State University, Tempe, pp. 155-157.

Hadidi et al., "Student's Acceptance of Web-Based Course Offerings: An Empirical Assessment," Department of Management Information Systems, School of Business and Management, University of Illinois at Springfield, pp. 1051-1053.

He et al., "Personal Security Agent: KQML-Based PKI," The Robotics Institute, Carnegie Mellon University, Oct. 1, 1997, pp. 1-14.

Moore et al., "The Information Warfare Advisor: An Architecture for Interacting with Intelligent Agents Across the Web," Science Applications International Corporation, Software & Systems Integration Group, pp. 186-188.

Pannu et al., "A Learning Personal Agent for Text Filtering and Notification," The Robotics Institue, School of Computer Science, Carnegie Mellon University, pp. 1-11.

Sameshima et al., "Authorization with security attributes and privilege delegation Access control beyond the ACL," Computer Communications, 20, 1997, pp. 376-384.

Sugumaran, "A Distributed Intelligent Agent-Based Spatial Decision Support System," Department of Business Administration, Le Moyne College, pp. 403-405.

Sycara et al., "Coordination of Multiple Intelligent Software Agents," International Journal of Cooperative Information Systems, pp. 1-31.

Sycara et al., "Distributed Intelligent Agents," The Robotics Institute, Carnegie Mellon University, pp. 1-32.

Zeng et al., "Cooperative Intelligent Software Agents," The Robotics Institute, Carnegie Mellon University, Mar. 1995, pp. 1-10.

Zhao, "Intelligent Agents for Flexible Workflow Systems," Department of Information and Systems Management, Hong Kong University of Science and Technology, pp. 237-239.

Weizenbaum, J. 1966, *ELIZA-A Computer Program for the Study of Natural Language Communication between Man and Machine*, Communications of the ACM vol. 9 No. 1: pp. 36-44.

Waltz, D.L. 1978, *An English Language Question Answering System for a Large Relational Database*, Communications of the ACM vol. 21 No. 7: pp. 526-539.

Codd, E.F., *How about Recently?* (*English Dialog with Relational Databases Using Rendezvous Version 1*). In B. Shneiderman (Eds.). *Databases: Improving Usability and Responsiveness*, 1978, pp. 3-28.

Hendrix, G.G. Sacerdoti, E.D. Sagalowicz, C. and Slocum, J. 1978, *Development a Natural Language Interface to Complex Data*, ACM Trans. on Database Systems vol. 3. No. 2: pp. 105-147.

Gross, B.J. Appelt, D.E. Martin, P.A. and Pereira, F.C.N. 1987, *TEAM; an Experiment in Design of Transportable Natural-Language Interfaces*, ACM Transactions vol. 32: pp. 173-243.

Janus, J.M. 1986, *The Semantics-based Natural Language Interface to Relational Databases*, in L. Bolc and M. Jarke (Eds). *Cooperative Interfaces to Information Systems*. pp. 143-187, New York: Springer-Verlag.

Motro, A. 1990, *FLEX, A Tolerant and Cooperative User Interface to Databases*, IEEE Transactions on Knowledge and Data Engineering. vol. 2 No. 2: pp. 231-246.

Guida, G. and Tasso C. 1982, *NLI: A Robust Interface for Natural Language Person-Machine Communication*, Int. J. Man-Machine Studies vol. 17: pp. 417-433.

International Search Report for International Application No. PCT/US01/16459, mailed Jun. 3, 2002.

Kamel, M. et al., "A graph based knowledge retrieval system," Proceedings of the International Conference on Systems, Man, and Cybernetics, Los Angeles, CA, Nov. 4-7, 1990, pp. 267-275.

Owel, V. et al., "Natural language query filtration in the Conceptual Query Language," Proceedings of the Thirtieth Hawaii International Conference on System Sciences, Wailea, HI, Jan. 7-10, 1997, pp. 539-549.

Shimazu, Hideo et al., "CAPIT: Natural Language Interface Design Tool with Keyword Analyzer and Case-Based Parser," NEC Research and Development, vol. 33, No. 4, Oct. 1, 1992, pp. 679-688, Tokyo, Japan.

Wu, X et al., "KDA: a knowledge-based database assistant," Fifth International Conference on Data Engineering, Los Angeles, CA, Feb. 1-10, 1989, pp. 402-209.

* cited by examiner

NATURAL LANGUAGE INTERFACE USING CONSTRAINED INTERMEDIATE DICTIONARY OF RESULTS

RELATED APPLICATIONS

This application claims the benefit under Title 35 U.S.C. §119(e) of U.S. Provisional Application Ser. No. 60/205,725, filed May 19, 2000, entitled "SEARCH AND LEARN: A NEW APPROACH TO NATURAL LANGUAGE USER INTERFACE FOR ENTERPRISE DATABASES" by Cheng Hsu and Veera Boonjing, and is a continuation-in-part of application Ser. No. 09/544,676 entitled "SYSTEM AND METHOD FOR ACCESSING PERSONAL INFORMATION," filed Apr. 17, 2000 by Cheng Hsu, et al and which is now abandoned, and the contents of the aforementioned applications are incorporated herein by reference.

FIELD OF THE INVENTION

The field of the invention generally relates to user interfaces, and more specifically, to user interfaces that recognize natural language.

BACKGROUND OF THE INVENTION

Natural language (NL) processing has achieved considerable progress in areas such as speech recognition end generation. Natural language systems have become commonplace, especially in server-based Internet applications, speech recognition products, database search tools, and other environments where human interaction is required. However, decades of hard work by some of the brightest minds in the Artificial Intelligence field has proven the understanding of speech one of the most evasive information technology goals. Researchers, therefore, have lowered their expectations for practical NL systems. For instance, existing NL prototypes focus on specific topics of conversation as more broader applications are more difficult to apply conventional NL techniques. Examples of these focused prototypes include the JUPITER telephone-based conversational system developed at the Massachusetts Institute of Technology that provides weather forecasts and the MOVIELINE system developed at Carnegie Mellon University that provides local movie schedules. These prototypes serve as a first step towards a broader range understanding of NL solutions. Alternatively, some leading industrial efforts concentrate on building a logical structure (conceptual networks—not linguistics) for a general dictionary to support understanding and translation (e.g., the MINDNET language processing software developed by Microsoft Corporation of Redmond, Wash.).

As applied in the database areas, existing natural language interfaces (NLIs) place severe restrictions on the syntax with which users articulate their natural queries. Users typically balk at such restrictions. Thus, prompted in part by the Internet, several systems (e.g., the ASK.COM® search engine of Ask Jeeves, Inc., Emeryville, Calif.) strive to make the restrictions invisible to users; but these restrictions are still within these systems. In these systems, accuracy of interpretation and effort required of the user depends on how closely a database query matches underlying "templates." Same emerging designs for database queries use semantic models and dictionaries, in a spirit similar to the logical structure approach. However, NL systems have not achieved the accuracy and reliability expected of them.

Demand for natural queries continues to grow not only in the area of database searching but also in the area of Internet search engines. The ASK.COM® search engine is an example of an Internet search engine that allows a user to perform natural queries in the form of a free format input. However, the search engine's results rely on (1) its recognized keywords, (2) predefined keyword related to recognized keywords (text classification), and (3) predefined possible questions (templates) associated with each group of keywords from (1) and (2). Its processing steps are (1) capture all recognized keywords from the inputs, (2) determine all keywords tat relate to recognized keywords, (3) retrieve and display predefined questions (each question wit one keyword group). Though the ASK.COM® search engine looks natural, it functions structurally as a text classification system, and does not actually interpret natural language queries. Therefore, it does not have the capability of processing natural language queries.

SUMMARY OF THE INVENTION

A problem realized with many conventional natural language system designs is that these designs require exceedingly large collections of linguistic terms that users use, but still might not be able to assure successful closure of users' queries. Because of design complexity and keyword database size, most systems are not practical to implement. A better approach to processing natural language inputs is therefore needed.

According to one embodiment of the invention, a system and method is provided that utilizes a definitive model of enterprise metadata, a design of keywords with simplified complexity, a graphical model of logical structure, a branch and bound search algorithm, and a case-based interaction method to process natural language inputs.

According to one aspect of the invention, a method is provided for processing a natural language input provided by a user. The method comprises providing a natural language query input to the user, performing, based on the input, a search of one or more language-based databases including at least one metadata database comprising at least one of a group of information types comprising case information, keywords, information models, and database values, and providing, through a user interface, a result of the search to the user. According to another embodiment of the invention, the method further comprises a step of identifying, for the one or more language-based databases, a finite number of database objects, and determining a plurality of combinations of the finite number of database objects. According to another embodiment of the invention, the method further comprises a step of mapping the natural language query to the plurality of combinations. According to another embodiment of the invention, elements of the metadata database are graphically represented.

According to another embodiment of the invention, the step of mapping comprises steps of identifying keywords in the natural language query, and relating the keywords to the plurality of combinations. According to another embodiment of the invention, the method further comprises a step of determining a reference dictionary comprising case information, keywords, information models, and database values. According to another embodiment of the invention, the step of mapping further comprises resolving ambiguity between the keywords and the plurality of combinations. According to another embodiment of the invention, the step of resolving includes determining an optimal interpretation of the natural language query using at least one of a group comprising rules and heuristics.

According to another aspect of the invention, a method for processing a natural language input is provided comprising providing a plurality of database objects, identifying a finite number of permutations of the plurality of database objects, the database objects being stored in a metadata database comprising at least one of a group of information comprising case information, keywords, information models, and database values, and interpreting at least one of the permutations to determine a result of the natural language input. According to another embodiment of the invention, the step of providing a plurality of database objects includes providing at least one of the group comprising data types, data instances, and database computational operators. According to another embodiment of the invention, the step of interpreting includes mapping the at least one of the permutations to a database query. According to another embodiment of the invention, the database query is formulated in a structured query language (SQL) query.

According to another embodiment of the invention, one or more permutations are eliminated. According to another embodiment of the invention, the method further comprises providing a reference dictionary comprising cases, keywords, information models, and database values, identifying, in the natural language input, a plurality of elements belong to the reference dictionary determining complete paths that implied by the plurality of elements that span elements of the natural language input and which belong to the graphics of the reference dictionary. According to another embodiment of the invention, the method further comprises determining a path that include elements of at least the informational models and database values. According to another embodiment of the invention, the method further comprises providing rules and heuristics for searching, and determining an optimum permutation based on the rules and heuristics. According to another embodiment of the invention, the method further comprises adding, as a result of user input, new cases and keywords to the reference dictionary. According to another embodiment of the invention, elements of the metadata database are graphically represented.

According to another aspect of the invention, a method is provided for processing a natural language input comprising determining, from the natural language input, a plurality of recognized terms, the recognized terms existing in a data dictionary having a logical graph structure, determining a minimum number of the plurality of recognized terms, and determining vertices associated with the minimum number of the logical graph structure, determining at least one minimum cost query graph that contains a minimum amount of vertices, if there are more than one minimum cost query graphs, remove at least one redundant cost query graph and producing a solution set of cost query graphs, determining, within the solution set, at least one cost query graph that is a complete solution, and translating the at least one cost query graph to a query language statement.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The invention is pointed out with particularity in the appended claims. The above and further advantages of this invention may be better understood by referring to the following description when taken in conjunction with the accompanying drawings in which similar reference numbers indicate the same or similar elements.

In the drawings.

DETAILED DESCRIPTION

Figure 1:
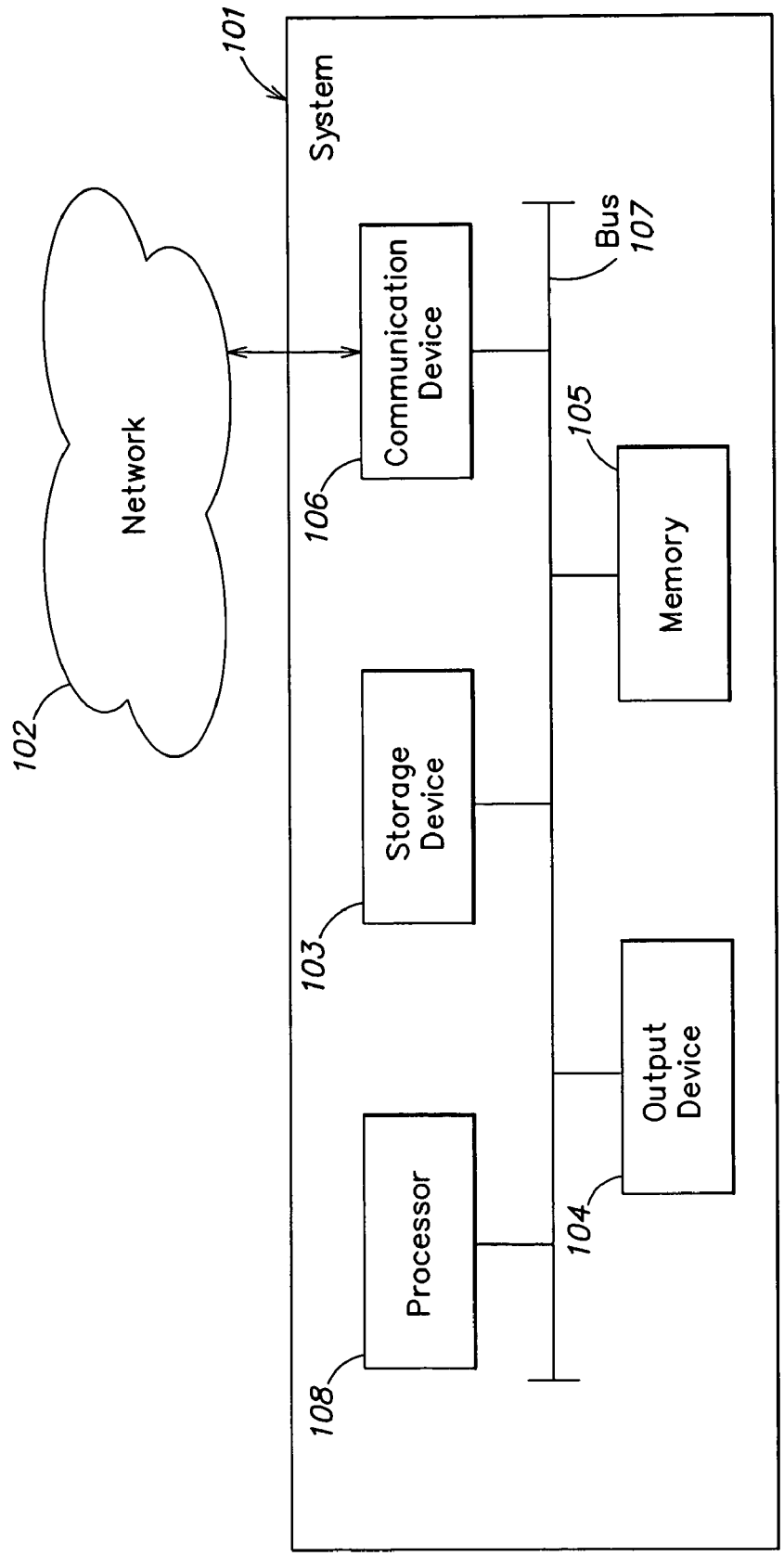
FIG. 1 shows a general purpose computer in which one embodiment of the invention may be implemented.

A typical goal of a natural language interface (NLI) to databases is to allow users to access information stored in databases by articulating questions directly in their natural language such as English. A large number of natural language interfaces have been developed by specialists in computational linguistics and artificial intelligence to achieve this goal. However, they do not seem to be truly "natural". In the context of this research, "truly natural" means any styles of linguistic articulation that a native speaker could understand and use sensibly. Available results tend to require of users using only some well-structured sentence templates and a tightly controlled vocabulary set to articulate queries. These artificial constructs are hardly natural to those who prefer their own choice of vocabulary, phrases, and expressions. Natural articulation goes beyond any fixed design of templates and significant-words dictionary. For example, a user of a Computer-Integrated Manufacturing database might query the system in any number of ways in a truly natural environment, such as:

I have asked you many times and I still have not heard a clear answer. Listen, I would like to know the status of my orders. I want to know what models you have started working on and how many of them are completed. I placed these orders on, I believe, Sep. 9, 1999. Could you please help? Thanks.

Step on John Smith's order. I want to know the exact status of all parts he ordered including their descriptions, prices, and quantities completed to-date. I understand that you're supposed to deliver it on Feb. 29, 2000. I know I might not have given you all the information you need, but please do your best, anyway. Okay? I'm waiting . . .

Just give me everything we have about John Smith and Jim Kowalski; both are our customers.

Orders of John Smith

Green's orders

PZ1 customers

Processing queries is difficult for the computer to interpret precisely. Queries embody the hallmark of natural languages: ambiguity and implicitness. Not only do multiple, different interpretations exist simultaneously for the same articulation of a query, the articulation might also even be incomplete or incorrect. Thus, a good NLI has to be able to either understand the natural articulation or to enumerate and evaluate all possible interpretations. Because experience can be used to improve interpretation (either understanding or enumeration-evaluation), an NLI also needs to be able to learn from its performance, including both successes and failures. Learning can involve a number of possible tasks throughout the entire query process. The NLI could respond intelligently to the user's articulation and if needed solicit more information about the query. It could confirm the meanings and results with the user in order to assist evaluation and assure correctness. The NLI could also retain valuable cases (usage patterns) so that the NLI could improve its performance. The first two tasks of learning could help "close the loop" so that a query is always executed properly (completeness and correctness of query processing), while the third reduces the complexity of interpretation (e.g., the number of possible interpretations).

Most previous research efforts on NLI have set out to find ways for the computer to understand the user's articulation, following the more established tradition of Artificial Intelligence (AI). But their results have stopped significantly short of being truly natural. They have all endeavored to devise particular controls and limitations on the naturalness of input and use these artifacts to assist interpreting queries into some standard database query languages. A handful of basic approaches limit naturalness so that the system can reduce the complexities of interpretation and process the queries successfully. These approaches include (1) a template-based approach, (2) a syntax-based approach, (3) a semantics-grammar-based approach, (4) an intermediate-representation-language-based approach, and (5) a semantics-model-based approach. These approaches differ in the way each controls input and in the extent to which each imposes controls on the user.

Each of the first four approaches requires users to articulate only in natural language forms that the system provides—or at least they assume that the user's articulation is consistent with these underlying forms. When this basic requirement or assumption does not hold in practice, the system fails to function properly (e.g., with poor performance and low accuracy), or even fails altogether. These forms typically feature some generic, linguistic prototype consisting of only one single sentence per query. Their disadvantage is in their restriction on naturalness.

The fifth and last approach seeks for naturalness, allowing free-format text as input, but it couples a particular NLI design with a particular domain of application. If the first four approaches are "top-down" in relying on predefined natural language forms, the last one in contrast exhausts all possible interpretations from the "bottom up". Its basic method is to provide a semantic model or a dictionary as the roadmap to generate possible interpretations. Its control is implicit: it assumes that users always query the databases known to the system, and can therefore always tune the NLI according to this known kernel of meaning.

One could argue that users are bound to refer, either directly or indirectly, to these known database objects (types or semantic models, instances or values, and operators) in their natural queries. If they do not use these database objects directly, they still have to use other words and phrases (henceforth known as "keywords") that correspond to these objects. Thus, the domain of interpretation is finite, compared to natural language processing in general. The semantic model provides a network of meanings of keywords, and a dictionary provides a more extensive collection of keywords beyond the usual semantic model. The critical success factor of the last approach depends clearly on the semantic model-dictionary employed, which must be powerful enough at least to span the range of possible usage which natural language encompasses. Because a database object can be only a grossly simplistic element of the natural vocabulary, keywords must shoulder the burden of representing naturalness. Their number could increase exponentially as the number of users and usage patterns increase, giving the bottom-up model the same disadvantages of the top-down model.

According to one embodiment of the invention, an NLI is provided that provides truly natural query capability to end users of enterprise databases in that the NLI interprets any style of articulation and to learn from the users in a way that improves both effectiveness and efficiency. The strategy uses a concept referred to herein as search and learn. This approach recognizes implicit enumeration-evaluation as a basic solution paradigm to the problem of natural language queries. Based on this analysis, a reference dictionary is used that integrates enterprise metadata (information models and contextual knowledge) with case-based reasoning. The new design affects two vital functions: (1) the generation of all possible interpretations of a natural query suitable for evaluation, and (2) the reduction of the complexity of keywords and the reduction of growth of keywords. According to one embodiment of the invention, a reference dictionary is used to search for an optimal solution and the dictionary "learns" from experience, achieving maximum naturalness with minimum enumeration. Compared to conventional approaches, this new approach promises realistic performance and completeness of a solution because the new reference dictionary and learning capability allows for the determination of complete solutions. In a broader sense, the new approach, according to one embodiment of the invention, identifies that the NLI problem is primarily a search problem and relates the problem to the vast tradition of constrained optimization (e.g., scheduling and traveling salesman).

According to one embodiment of the invention, it is realized that models are the conceptual networks of enterprise databases, which are the known domain of enterprise users' queries. Therefore, it develops an innovative approach to use enterprise metadata to search and interpret the meaning of natural queries. The objective is to support queries expressed in any combinations of multiple sentences (essays), any forms of sentence (complete or not), and any vocabulary (personal or standard) against databases that have well-defined information models. Furthermore, this objective may be accomplished with practical performance free of the above problems. A simplified model of the general logical structure paradigm is provided which is more generic than the current NLI prototypes, when applied to enterprise database queries. According to various embodiments of the invention, an NLI system includes one or more of a new class of reference dictionary (of enterprise metadata), a branch-and-bound search method, and a case-based reasoning design, to implicitly evaluate a number of possible interpretations of the user's natural articulation and determine the optimal solution. An advantage of various aspects of the invention is that there is no reliance on linguistics; nor is there a requirement of an all-encompassing linguistic-grammatical dictionary. Various embodiments of the invention implement alternative approaches to the traditional machine learning NL approaches.

Enterprise databases represent well-defined application domains and their metadata provide webs of concept for the domains. One task is to determine a minimally sufficient set of metadata and develop a feasible logical structure for natural queries, such that the system could interpret the queries using the structure alone. Users are bound to refer, either directly or indirectly, to database objects (including data semantics, structures, instances or values, and operators) in their natural queries. If they do not use directly these database objects, they articulate their queries in terms of other significant words and phrases (i.e., keywords) that correspond sufficiently to these objects. Therefore, a natural query is reducible to a particular combination of these database objects and keywords. Conversely, a particular combination of database objects and keywords could represent a particular natural query. These keywords are overwhelming when all possible permutations of natural words (phrases) in queries are considered (i.e., a linguistic dictionary). However, keywords could be manageable if they are based on database objects and other known enterprise metadata.

The next problem is that correspondences between natural articulation and metadata are usually not unique due to, for example, incomplete matching or ambiguity. Because there may be ambiguity, implicit enumeration and evaluation may resolve such ambiguities. When a logical structure of all database objects and keywords is in place, combinations become ordered sequences according to the structure, and thereby allow precise evaluation. In other words, a particular permutation of database objects and keywords of the logical structure has a particular interpretation for database query. If the system identifies all permissible permutations implied by a query and evaluates their relative merits, the system has essentially interpreted the query. Then, it is possible to map the query to the underlying database query language (such as SQL) without having to understand linguistically the human meaning of the words and phrases used. This approach is feasible since the space of search (domain of interpretation) is finite; a particular database or distribution of databases has only finite objects. The situation is fundamentally different from conventional natural language processing where the possibility of permutation is virtually infinite. Of course, even the relatively small, finite number of database objects could generate a large number of possible permutations. Thus, according to one embodiment of the invention, a metadata search may be used to efficiently manage database objects.

The above argument presents a way to systematically resolve ambiguity in natural queries. That is, according to one embodiment of the invention, it is realized that ambiguity is the deviation from an exact and sufficient match on the logical structure, including no matching of metadata as well as all forms of multiple matching. In the worst case, the system might not be able to identify any database object and keyword at all. In response to a failure in identifying an object, the system may search the entire space of existing permutations and evaluate each of them for the user to determine which one is correct. Note that, this approach still has a better lower bound than generic natural language processing, which fails without user feedback. Each additional database object the system recognizes as the result of user feedback serves to eliminate certain space from the search and narrow down the possible interpretations. In the best case, the system identifies a single complete permutation in the input and determines a unique and correct interpretation for the user.

It is clear that a minimally sufficient set of metadata can include all proven database objects, of which the information models are largely constant (known at the design time) but the database values are extensible at run time. Therefore, according to various embodiment of the invention, a "base" set of proven database objects may be provided with an NLI system, and modification and/or new database objects may be added at runtime. Next, the metadata set includes keywords to assist matching with database objects.

Keywords, according to one embodiment of the invention, may be identified, organized, and controlled based on an enterprise information model connected to database values. Each database object corresponds to a finite number of keywords, and keywords would generally not be derived from any enumeration of possible permutations of words in natural queries. Therefore, the information model-based subset of keywords would generally be a constant (or a linear growth with a small slope), leaving the database value-based subset to grow with new applications and attain sufficiency without infinite growth in the number of keywords as in conventional systems. According to one aspect of the invention, keyword growth would be a polynomial-type growth at most. Complexity of keywords in accordance with various embodiments of the invention is a significant improvement over that of a linguistic dictionary, whose growth is exponential by nature due to the number of keyword permutations. Further, cases of query processing may be created and integrated with other metadata. Thus, according to one aspect of the invention, there are four layers of enterprise metadata (resources of search) considered; i.e., cases, keywords, information models, and database values. According to one aspect of the invention, they are integrated in an extensible metadata representation method so that every resources item references all other related resources for query interpretation. A repository of metadata may be implemented as, for example, a reference dictionary. More particularly, a semantically based graphical abstraction of the reference dictionary may be used to define the logical structure of the enterprise database query for the application domain concerned. The core of the reference dictionary (information models and initial keywords) may be, for example, a design-time product, developed by analysts, designers, and users. Cases and additional keywords and other metadata (e.g., changes to the information models) and database values can be added during runtime as the enterprise database system ages and evolves. Further, case-based reasoning may be used for producing richer keywords and cases.

General Purpose Computer System

Various aspects of the present invention may be described with reference to a general purpose computer system 101 such as that shown in FIG. 1. The computer system 101 may include a processor 108 connected to one or more storage devices 103, such as a disk drive through a communication device such as bus 107. The computer system also includes one or snore output devices 104, such as a monitor or graphic display, or printing device. The computer system 101 typically includes a memory 105 for storing programs and data during operation of the computer system 101. In addition, the computer system may contain one or more communication devices that connect the computer system to a communication network 106.

Computer system 101 may be a general purpose computer system that is programmable using a high level computer programming language. The computer system may also be implemented using specially programmed, special purpose hardware. In computer system 101, the processor 108 is typically a commercially available processor, such as the PENTIUM, PENTIUM II, PENTIUM III, PENTIUM IV, or StrongARM microprocessors from the Intel Corporation (Santa Clara, Calif.) ATHLON or DURON processor available from Advanced Micro Devices, Inc. (Sunnyvale, Calif.), PowerPC microprocessor (available from IBM, Armonk, N.Y.), SPARC processor available from Sun Microsystems, Inc. (Santa Clara, Calif.), or 68000 series microprocessor available from Motorola Inc. (Schaumburg. Ill.). Many other processors are available. Such a processor usually executes an operating system which may be, for example, DOS, WINDOWS 95, WINDOWS NT, WINDOWS 2000, or WinCE available from the Microsoft Corporation (Redmond, Wash.), MAC OS SYSTEM 7 available from Apple Computer, (Cupertino, Calif.), SOLARIS available from Sun Microsystems, Inc. (Santa Clara, Calif.), NetWare available from Novell Incorporated (Bellevue, Wash.), PalmOS available from the 3COM corporation (Marlborough, Mass.), or UNIX-based operating systems (such as LINUX) available from various sources. Many other operating systems may be used.

The communication network 102 may be an ETHERNET network or other type of local or wide area network (LAN or WAN), a point-to-point network provided by telephone services, or other type of communication network. Information consumers and providers, also referred to in the art as client and server systems, respectively, communicate through the network 102 to exchange information.

Various aspects of the present invention may be performed by one or more computer systems, processors, or other computing entity. Various aspects of the present invention may be centralized or distributed among more than one system, and the invention is not limited to any particular implementation.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

A general-purpose computer system 101 may include a natural language user interface (NLUI or simply NLI), through which a user requests information and performs other transactions. For instance, the user may provide input and receive output from graphical user interfaces. In one case, the interface may prompt a user with a series of questions, to which the user may respond. The questions may be multiple choice question format, of which a single selection of the choices is an appropriate response. However, the system 101 may present a general query interface on graphical user interface, through which the user may pose natural language queries or responses to questions. For example, system 101 may prompt the user to "Please enter a search (natural language or keyword)." In response, the user may provide a natural language response, asking system 101 "Where is the Houston Field House at RPI located?" The natural language interface may have associated with it a natural language analyzer which determines the meaning of a provided input.

Natural Language Analyzer

According to one embodiment of the invention, a natural language analysis system is provided such as the system shown in FIG. 2 discussed in more detail below. The natural language analysis system finds the meaning of the request and determines the correct source of the information requested. For example, system 101 may format and send the request to a server-based system, and the server-based system may return the result to system 101.

In general, a natural language analyzer that analyzes queries (hereinafter termed a "natural language query processor") may be part of computer system 101. This query processor may perform one or more analyzing steps on a received query, which is generally a string of characters, numbers, or other items. A long-standing goal in the field of information technology is to allow humans to communicate with computer systems in the natural languages of humans. However, because of the various ambiguous and implicit meaning found in natural language, queries are difficult for a computer system to interpret precisely.

Most of the conventional methods for understanding natural language queries involve determining a method of understanding a user's natural language articulation by implementing various methods of artificial intelligence. There are several conventional approaches to limiting the naturalness of language so that the system could reduce the complexities of interpretation and successfully process queries. They include (1) template-based approach [e.g., Weizenbaum, J. 1966, *ELIZA-A Computer Program for the Study of Natural Language Communication between Man and Machine, Communications of the ACM* Vol. 9 No. 1: pp. 36–44], (2) syntax-based approach [e.g., Waltz, D. L. 1978, *An English Language Question Answering System for a Large Relational Database, Communications of the ACM* Vol. 21 No. 7: pp. 526–539, Codd, E. F, R. S. Arnold, J-M. Cadiou, C. L. Chang, and N. Roussopoulos, *RENDEZVOUS Vesion* 1: *An Experimental English Language Query Formulation System for Casual Users of Relational Data Bases*, IBM Research Report RJ2144, 1978., Codd, E. F., *How about Recently?* (*English Dialog with Relational Databases Using Rendezvous Version* 1). In B. Shneiderman (Eds). *Databases: Improving Usability and Responsiveness,* 1978, pp. 3–28.], (3) semantics-grammar-based approach [e.g., Hendrix, G. G. Sacerdoti, E. D. Sagalowicz, C. and Slocum, J. 1978, *Development a Natural Language Interface to Complex Data, ACM Trans. on Database Systems* Vol. 3. No. 2: pp. 105–147], (4) intermediate-representation-language-based approach [e.g., Gross, B. J. Appelt, D. E. Martin, P. A. and Pereira, F. C. N. 1987, *TEAM: an Experiment in Design of Transportable Natural-Language Inter-*

*faces, ACM Transactions* Vol. 32: pp. 173–243], and (5) semantics-model-based approach [e.g., Janus, J. M. 1986, *The Semantics-based Natural Language Interface to Relational Databases*, in L. Bolc and M. Jarke (Eds), *Cooperative Interfaces to Information Systems*, pp. 143–187. New York: Springer-Verlag Janus, J. M. 1986, *The Semantics-based Natural Language Interface to Relational Databases*, in L. Bolc and M. Jarke (Eds). *Cooperative Interfaces to Information Systems*. pp. 143–187. New York: Springer-Verlag, Motro, A. 1990, *FLEX, A Tolerant and Cooperative User Interface to Databases, IEEE Transactions on Knowledge and Data Engineering.* Vol. 2 No. 2: pp. 231–246, Guida, G. and Tasso C. 1982, *NLI: A Robust Interface for Natural Language Person-Machine Communication, Int. J Man-Machine Studies* Vol. 17: pp. 417–433].

These conventional approaches differ in the way each controls the input and in the extent to which each exerts the control on the user. The first four approaches (1)–(4) require users to articulate only in the natural language forms that the system provides—or at least they assume that the user's articulation is consistent with these underlying forms. When this basic requirement or assumption does not hold in practice, the system would fail to function properly (e.g., with poor performance and low accuracy), or even fail altogether. These forms typically feature some generic, linguistic prototype consisting of only one single sentence per query. Thus, their advantage is that the resultant NLI is easily portable from one database system to another. The disadvantage is the restriction on naturalness of the input from the user. The last approach (5) essentially embraces a different priority, placing naturalness ahead of portability (i.e., coupling a particular NLI design with a particular domain of application, but allowing free-format text as input). If the first four approaches are top-down in their relying on the computer's direct understanding of the user's articulation, the last one could be considered as the computer's exhausting of all possible interpretations from the bottom up.

The basic strategy of system (1)–(5) is to provide a semantic model or a dictionary as the roadmap for generating possible interpretations. These systems assume that the users always query databases known to the system, thus the NLI could be tuned according to this known information. According to one embodiment of the invention, it is recognized that, under this assumption, users are bound to refer, either directly or indirectly, to these known database objects (types or semantic models, instances or values, and operators) in their natural queries. If they do not use directly these database objects, they have to articulate their query in terms of other significant words and phrases (hereinafter referred to as "keywords") that correspond to these objects. Thus, the domain of interpretation is finite, compared to natural language processing in general. Semantic model is a form of keywords and a dictionary is a more extensive collection of keywords beyond a usual semantic model. The critical success factor of this approach is clearly the semantic model-dictionary employed, which must be powerful enough to span efficiently the space of possible usage of natural language in the domain. Because database objects can only be a grossly simplistic portion of the natural vocabulary, keywords must shoulder the burden of representing naturalness. Their number could increase exponentially as the number of users and usage patterns increase.

There is a need to consider the logical structure paradigm in addition to the narrow application paradigms used above. This paradigm enumerates all concepts—i.e., the logical association of words—that users could use for articulation in the place of a linguistic structure to interpret natural languages. An example would be Microsoft's MindNet software technology developed by Microsoft Corporation of Redmond, Wash., which derives conceptual networks (webs of concepts) of, say, a standard dictionary and matches human queries against the structure. Here, matching is essentially the interpretation. This is obviously a monumental effort in the general case for general natural language processing. However, enterprise databases already represent a much focused application domain of querying; and more significantly, they also provide a much narrower range of concepts and their logical structures. In the database field, information models are webs of concepts for enterprise databases. The problem is, these webs of concepts are typically far from being sufficient for capturing all meaningful words that users could use naturally to articulate queries in the application domain. Thus, to create an efficient logical structure to support a truly natural query, one has to find a way to design a sufficient reference dictionary tat will not grow exponentially, and a way to optimally enumerate and evaluate all possible interpretations.

A new approach according to one embodiment of the invention recognizes implicit enumeration-evaluation as a basic solution paradigm to the problem of natural language queries. The new approach includes designing a reference dictionary of concepts that integrates enterprise information models and contextual knowledge with user-oriented keywords and past cases of usage, to provide the logical structure of natural queries for the enterprises databases concerned. The new design affects two vital functions: (1) generate all possible interpretations of a natural query suitable for evaluation, and (2) stem the complexity and growth of keywords. A new NLI method according to one embodiment of the invention uses a branch-and-bound algorithm to search for an optimal interpretation of the natural query based on the logical structure. Case-based reasoning adds to the search to achieve maximum naturalness with minimum enumeration. With this objective accomplished, truly natural database query would become possible for enterprise applications, which account for a significant portion of all natural language processing needs. In a broader sense, the proposed project formulates for the first time the NLI research as a search problem and relates it to the vast tradition of constrained optimization (e.g., scheduling and traveling salesman). Because, according to one embodiment of the invention, constrained optimization is used, solution to the natural language query problem is bounded. Drawing ideas and strengths from this tradition as well as from the literature of NLI, the new metadata search model according to various aspects of the invention is able to add to the paradigm of logical structures for natural language processing.

Figure 2:
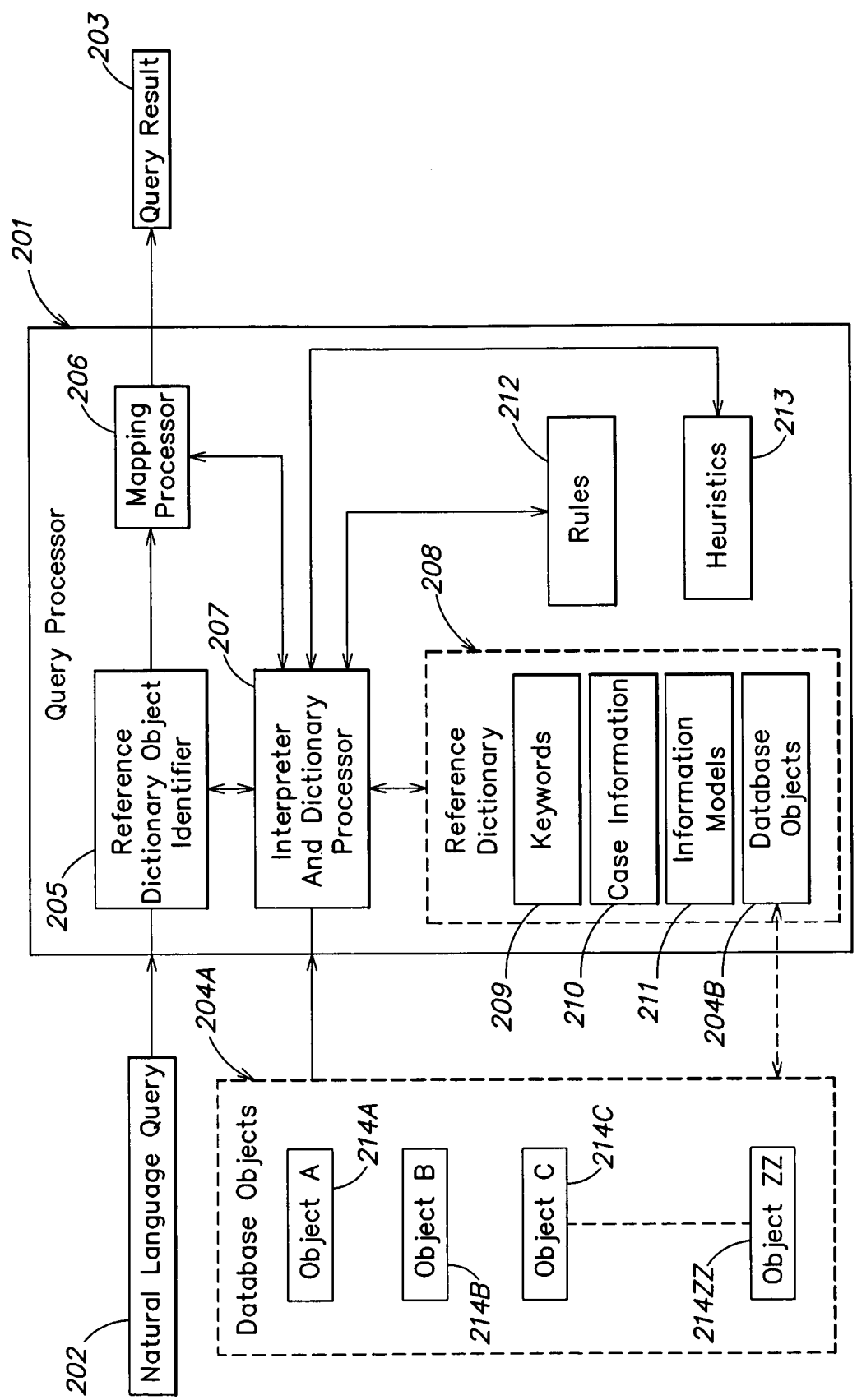
FIG. 2 shows a natural language query processor in accordance with one embodiment of the invention.

FIG. 2 shows a natural language query processor 201 according to one embodiment of the invention. Processor 202 receives a natural language query and a plurality of database objects 204, and produces a query result. The natural language query may be, for example, a paragraph, a sentence, sentence fragment, or a plurality of keywords. The query result may be any information that is relevant to the combination of database objects 204A and query 202. According to one embodiment of the invention, the natural language query 202 is mapped to the plurality of database objects 204A using a reference dictionary 208 comprising keywords 209, case information 210, information models 211, and database object values 204B. An advantage of this mapping is that less-capable processing hardware is needed to perform the mapping than traditional natural language processing algorithms such as those cited above, because the number of keywords that needs to be recognized and searched by the system is reduced. This advantage enables, for example, use of such an NLI on a portable device such as PalmPilot, or other portable device that has limited storage capability. Also, because the portable device may be allocated to a single user, and processor 201 is capable of learning using case-based learning, processor 201 may become more accurate for the particular user.

Natural language processors are well-known, and functions they perform are described in more detail in the book entitled *Natural Language Understanding*, by James Allen, Benjamin/Cummings Publishing Company, Inc., Redwood City, Calif., 1994, herein incorporated by reference. Other natural language query processors are discussed in the journal articles and books cited above.

According to one embodiment of the invention as shown in FIG. 2, query processor 201 includes a reference dictionary object identifier 205 that parses query 202 and generates one or more objects recognized in the reference dictionary 208. Reference dictionary object identifier 205 also identifies words that are meaningful in the reference dictionary 1208 and eliminates useless or meaningless words. Processor 201 also accepts and processes a number of database objects 204A. As discussed, processor 201 may have an associated reference dictionary 208 that includes keywords 209, case information 210, information models 211 and one or more database objects 204B. Keywords 209 may be, for example, a set of keywords and their combinations generated from the plurality of database objects 204A, which includes one or more objects 214A–214ZZ. Keywords 209 may also be "learned" from a user through performing queries, or may be provided through a separate keyword administrator interface associated with query processor 201.

Query processor 201 also includes an interpreter and dictionary processor 207 that receives objects identified by the reference dictionary object identifier 205 and determines an optimal interpretation of the received objects. More specifically, processor 207 determines optimal interpretations of the received objects, resolves ambiguities, updates information models 211, and interacts with users to facilitate learning. Processor 207 utilizes rules 212 and heuristics 213 to resolve ambiguities in determining the optimal interpretation of query 202. Rules 212 and heuristics 213 may relate to information models 211, which are in turn related to keywords 209, cases 210, and database objects 204B in a semantic manner. When there are ambiguities in the interpretation of objects, e.g. multiple possible interpretations, multiple permissible combinations of meaningful objects, etc., rules 212 and heuristics 213 related to these objects are used to reduce or resolve these ambiguities.

Mapping processor 206 performs a mapping between incoming objects and database objects 204A. In particular, processor 206 may generate database queries from the objects and the interpretations provided by identifier 205 and processor 207, respectively. Processor 206, may, for example, generate SQL queries used to locate database objects 204A. These queries may be executed by an SQL search engine, and processor 201 may provide query result 203 to user through, for example, a graphical user interface.

Literature on NLI clearly indicates that establishing a complete set of keywords is a key factor in handling ambiguity. However, according to one aspect of the invention, additional information beyond keywords are used to determine the meaning of an input query. This additional information makes it possible to use a collection of keywords far smaller than those required by conventional NL processing methods. Particularly, there are four layers of resources comprising a data dictionary that are used to relate an incoming query 202 to database object 204A; i.e., cases 210, keywords 209, information models 211, and database object values 208B. These resources may be integrated through an extensible metadata representation method so that every piece of resources references to all other related resources in a semantically-based graphic. For instance, a keyword 209 points to the semantic subject(s) it refers to, which points in turn to entities, relationships, and items pertaining to the subject(s), and ultimately to database object values 204B. The keywords 209 also connect to cases 210 involving them. The core of the reference dictionary (information model, initial keywords, and database structure) maybe, for example, a design-time product, developed by the analysts, designers, and users. Cases and additional keywords, metadata (e.g., changes to the information model) and database values may be added during operation of the system, and thus the system ages and evolves. A learning mechanism allows richer keywords and cases to provide more accurate performance. The reference dictionary enables a computer system to recognize a feasible region of interpretations of the input query 202 and evaluate them. The reference dictionary 208 also serves as the basis for interaction with the user (identifying needs and generating meaningful reference points) and acquisition of lessons (determining additional keywords and cases)—i.e., the reference dictionary may be used to assist the user in learning.

A reference dictionary according to one embodiment of the invention has four fundamental attributes, as compared to conventional systems: the reference dictionary according to one embodiment of the invention generates search-ready graphics-based representation of all four layers of resources; supports learning; simplifies keywords, and assures complete interpretations of natural queries. Regarding the last two points, the inclusion of information models 211 and case information 210 reduces the volume of keywords 209 needed to reduce the first two sources of ambiguity. For example, consider a natural articulation in the form of a short essay. If the essay consists of n words of which m are database objects or other recognized dictionary entries, there could be n/m words associated with each known term. These n/m words become the candidate keywords for the term. When including phrases (grouping of words), there could be, in theory, up to m*(n/m)! new keywords implied from the short essay. It is desired to increase the number m (hits) because the bigger m becomes, the fewer (exponentially) the possible groupings of words becomes, thus resulting in fewer new keywords to consider or to add to the dictionary.

Properly-developed information models 211 having rich semantics provide a large m for the initial design of keywords, and increase the chance of subsequent "hits" (their use in queries) in practice resulting in less ambiguity, less possible interpretations to search, and less new keywords needed. Case information 210 do not directly change m, but do help in resolving some ambiguity and hence still helps reducing the need for new keywords. Information models 211 and cases 210 represent a tightly structured, efficient kernel of meaning with which the users are familiar and tend to use more frequently in their articulation with respect to the particular databases. In addition, information models 211 and case information 210 also contribute to resolving another type of ambiguity. In particular, they identify the possible missing information for incomplete input, by examining the graphics of the reference dictionary. Therefore, a reference dictionary determines more accurately and quickly than conventional systems a complete set of possible interpretations for queries articulated in a natural language format.

Search and Learn

Basic logic of a search and learn approach according to one embodiment of the invention will now be described. Given a reference dictionary R={C, K, M, D}, representing respectively the sets of cases C, keywords K, information models M, and database values D, a method for searching according to one embodiment of the invention is as follows:

Step 1: Identify all words and phrases in the input natural language query 202 that also belong to R. Denote this set of elements I (including possibly elements from K, M or D).

Step 2: Determine all possible, complete paths implied by I that span all input elements and query 202 and belong to the overall graphics of R. These paths might include additional elements inferred from the reference dictionary in order to complete the paths. A complete path includes elements (original or inferred) in M and D. Each path corresponds to a particular interpretation of the original query.

Step 3: Search for the best interpretation by using branch and bound methods when multiple possible solutions exist. If multiple possible solutions exist, the elements in C that are associated with elements of I are used to resolve the ambiguity.

Step 4: Map the result to the database query language. Obtain the results of query and confirm them with the user.

Note that a learning mechanism may be engaged to interact with the user whenever the result provided at each step is insufficient. The outcome of the learning is stored in the system 201 as new cases and keywords added to C and K, respectively. Also, note that each step allows for a wide range of possible strategies and algorithms to implement it.

Reference dictionary 208 may also be based on a metadatabase model described in more detail below with respect to FIG. 4. In particular, a reference dictionary having a model that integrates four different types of enterprise metadata may be used. These metadata types include: database structure, semantic model, application, and software resource. The model may be used to form a core of the reference dictionary, and this core may be extended to include other three layers: keywords, cases and database values, and hence form the integrative (connected) structure of the reference dictionary. The other benefits of using this model includes its capability to incorporate rules and to support global query processing across multiple databases. A modeling system helps the development and creation of the metadatabase.

Reference Dictionary

Figure 3A:
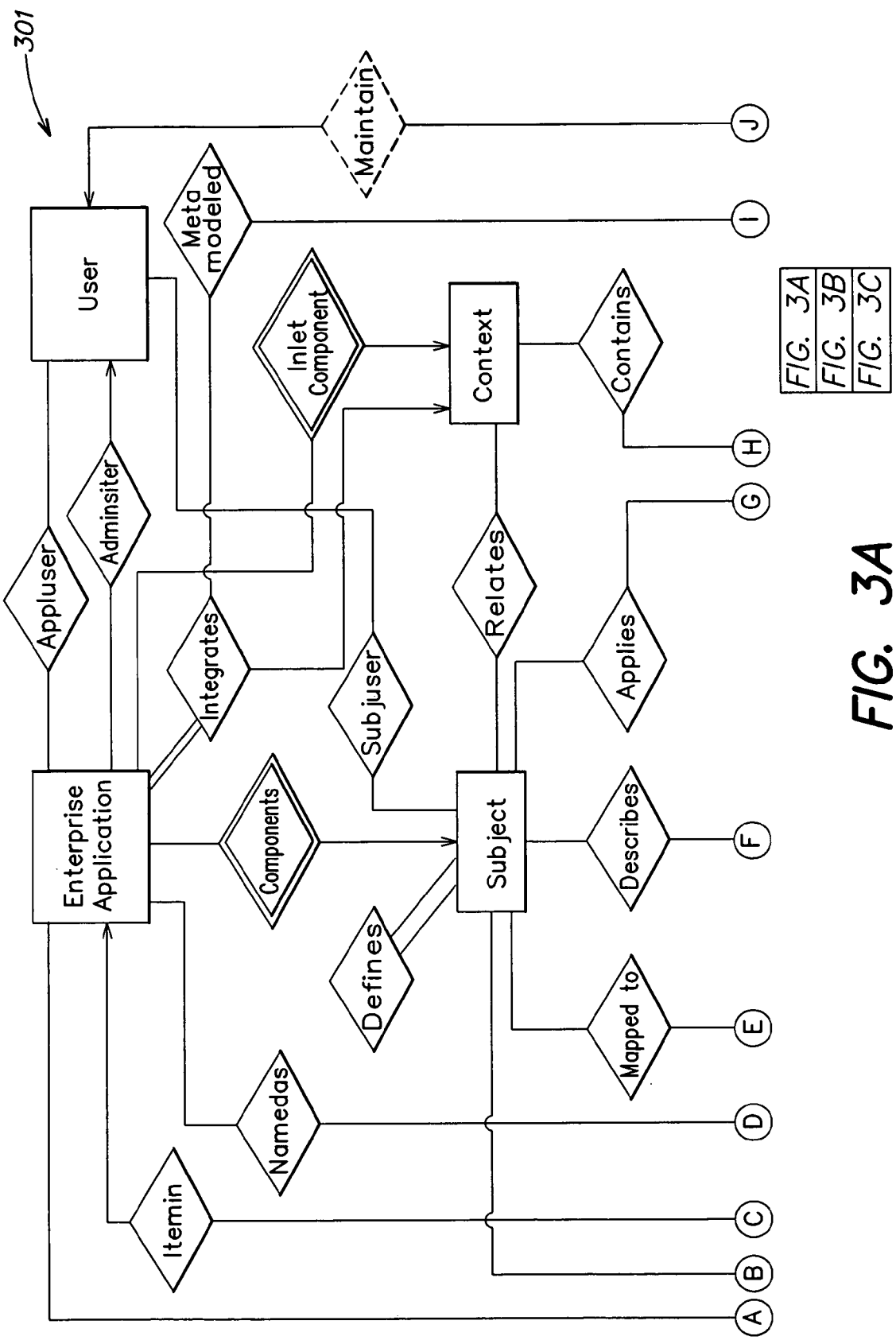
FIG. 3 shows a reference dictionary in accordance with one embodiment of the invention.
Figure 3B:
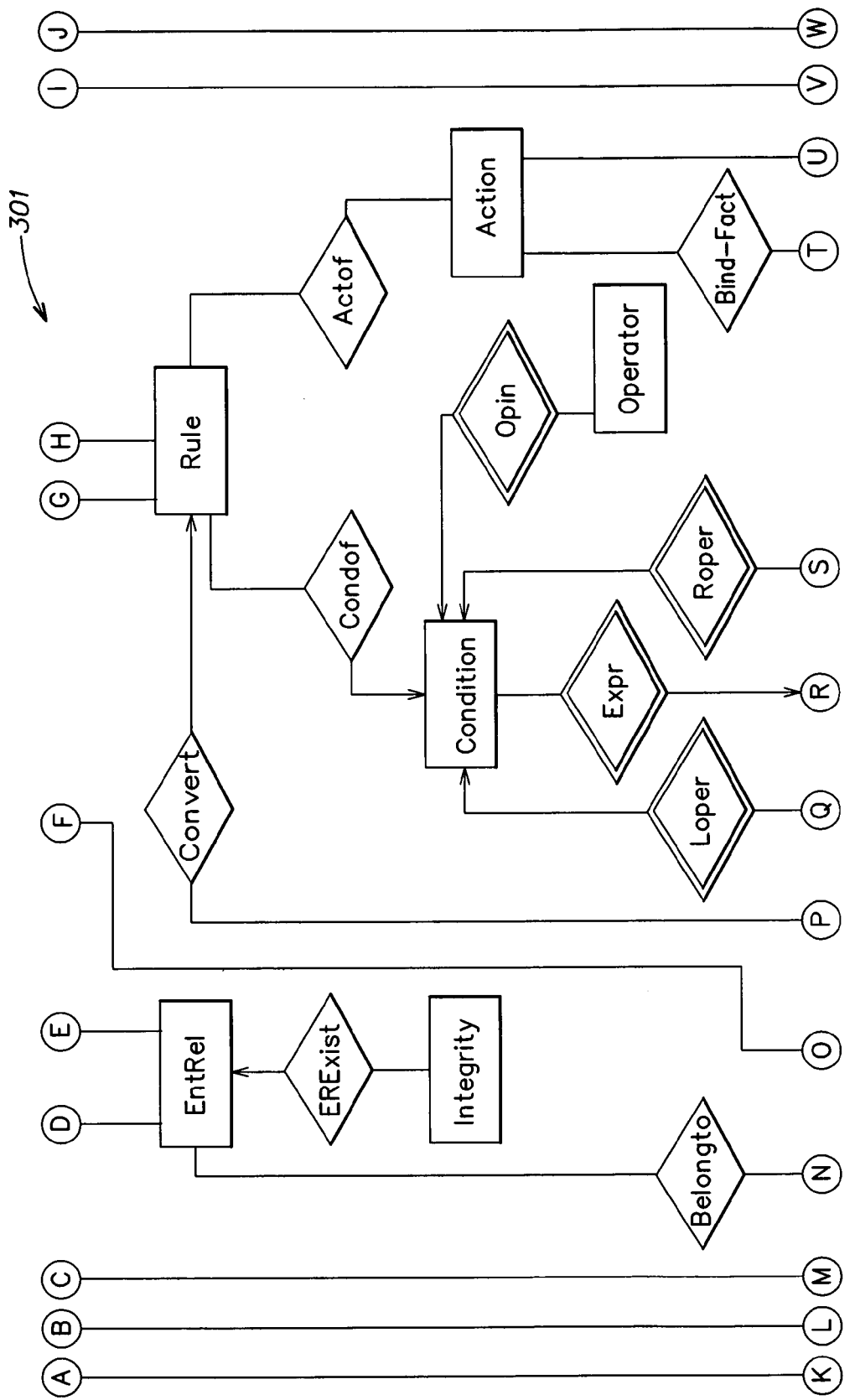
Figure 3C:
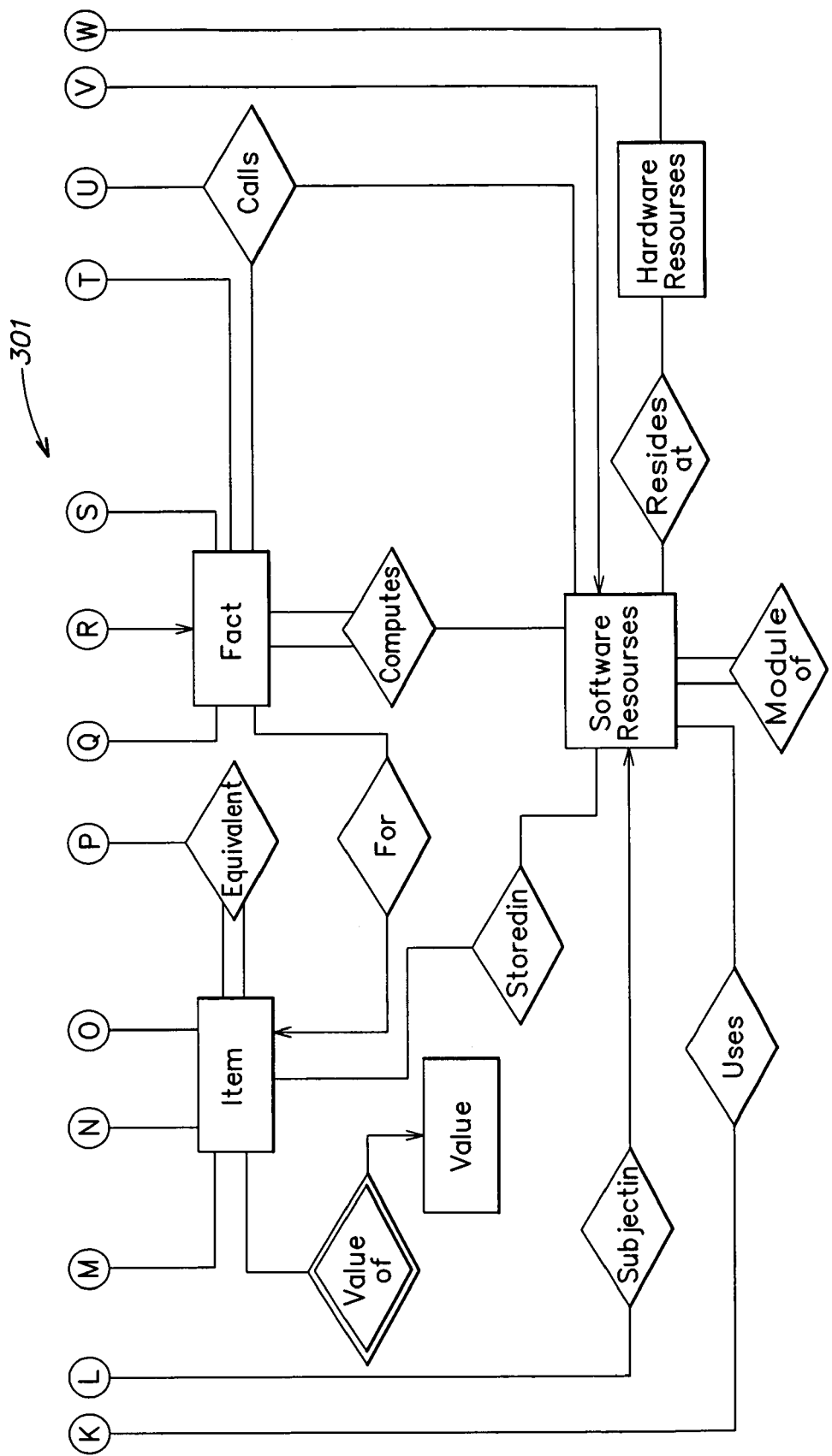

A structure of an example reference dictionary 301 is shown in FIG. 3. Each object in the figure represents either a table of metadata (in the case of square icon and diamond icon), or a particular type of integrity control rules (in the case of double diamond and broken diamond). These metadata include subjects and views, entity-relationship models, contextual knowledge in the form of rules, application and user definitions, database definitions and values, keywords, and cases.

Keywords, as noted above, are the natural words and phrases users use to refer to database objects and information model elements in natural articulation such as a natural language query. They could represent instances, operators, items (attributes), entities, relationships, subjects, and applications. A keyword according to one embodiment of the invention is defined as an ordered pair of (class, object). Classes include Application, Subject, EntRel (entity-relationship), Item, Value, and Operator; all of which are metadata tables shown in FIG. 3. Objects are instances (contents) of these classes. Because a hierarchy of objects in the core structure of the reference dictionary is Item-EntRel-Subject-Application, an object can be identified by an ordered quadruple (Item name, EntRel name, Subject name, Application name). In the model, however, each object has a unique identifier, thus the ordered quadruple is not needed to uniquely identify each object. It should be understood that any method for identifying objects may be used.

Metadatabase Model

As discussed above with reference to FIG. 3, system 101 may use a database to store keywords and other information. According to one embodiment of the invention, the database is metadatabase, which is well-known in the art of data and knowledge management tools. Metadatabase theory is described in more detail in a number of books and publications, including the book entitled *Enterprise Integration and Modeling: The Metadatabase Approach*, by Cheng Hsu, Kluwer Academic Publishers, Amsterdam, Holland and Boston, Mass., 1996. Also, metadatabase theory is described in the journal article by Hsu, C., et al. entitled *The Metadatabase Approach to Integrating and Managing Manufacturing Information Systems*, Journal of Intelligent Manufacturing, 1994, pp. 333–349. In conventional systems, metadatabase theory has traditionally been applied to manufacturing problems. A metadatabase contains information about enterprise data combined with knowledge of how the data is used. The metadatabase uses this knowledge to integrate data and support applications.

Figure 4:
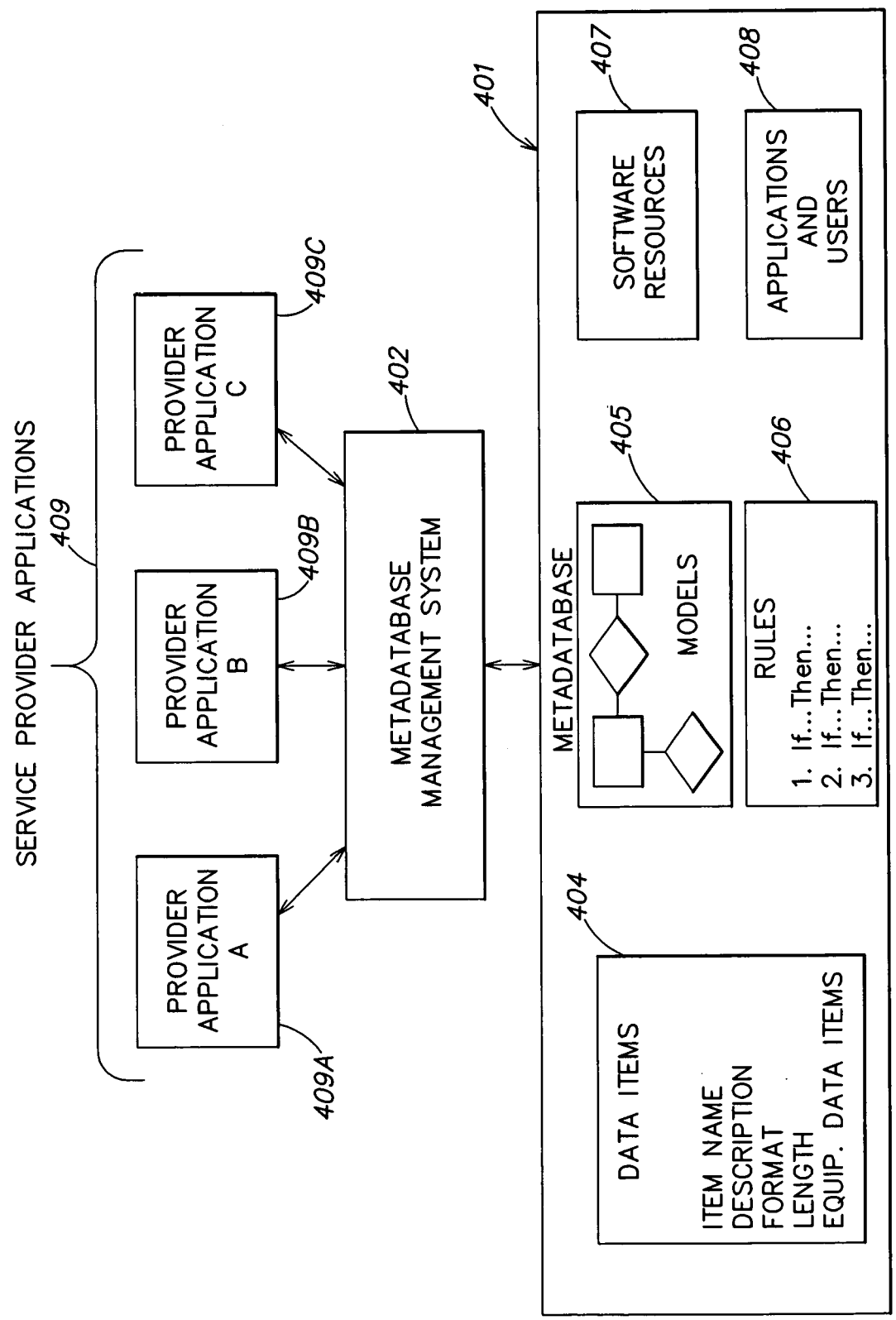
FIG. 4 shows a metadatabase system in accordance with one embodiment of the invention.

The metadatabase model as shown in FIG. 4 uses a structure that shows how a metadatabase system 402 provides an enterprice information model describing data resources of globally-distributed provider systems applications and their control strategy in the form of rules. These globally-distributed systems applications may be executed, for example, at one or more provider systems discussed above. The metadatabase system 402 communicates with service provider applications 409, such as the three provider applications 409A, 409B, 409C illustrated in FIG. 4. The information model also includes knowledge regarding dynamics of information transfer such as "what and how" information is shared among local systems and under what circumstances it is used. The information model may be in the form of a metadatabase 401 having data items 404, models 405, rules 406, software resources 407 and application and user information 408.

Case-based Reasoning

A case in a case-based reasoning paradigm typically includes three components: problem definition, solution, and its outcome. New problems would use the problem definition to find the (best) matching cases and apply the associated solutions to them. The third component is useful when the domain knowledge is incomplete or unpredictable. In this research, the reference dictionary contains complete domain knowledge needed, thus, we expand the problem definition but drop outcome. The system uses cases to resolve ambiguity in the recognition of meaningful terms (i.e., user's natural terms that are included in the reference dictionary) in the input and to help determine the solution among multiple possible interpretations. Thus, the case structure includes case-id, case-type, choices, context, and solution. For the type of resolving term ambiguities, a set of known terms describes the context (for problem definition).

User's selection among possible choices of the meaningful term defines the solution. For the interpretation ambiguities type, a set of known elements of the information model describes the context, possible paths in the information model define the choices, and user's selection solution.

The resources (entries) of the reference model are connected in two ways. Recall that the structure shown in FIG. 3 may be a meta-schema representing the types and organization of all enterprise metadata. Thus, the elements of information models are metadata instances stored in some of the meta-entities (squares) and meta-relationships (diamonds) of the structure. These model elements are themselves connected internally in terms of their entity-relationship semantics. They are also connected externally to other types of resources including database values, keywords, and cases through the meta-schema. Keywords and cases are connected to information models and database values through particular meta-relationships. In other words, elements of information models (subjects, entities, relationships, and items) and keywords are linked to the database objects they represent. Therefore, the reference dictionary contains sufficient knowledge to determine the database objects involved and required for all queries defined sufficiently in information model elements or keywords.

Each sufficient statement corresponds to a complete and unique path (connection) of these elements and their corresponding database objects. (An SQL-like style database called MSQL may determine the shortest path when alternative paths exist. MSQL is discussed further in the journal entitled *The Model-Assisted Global Query System for Multiple Databases in Distributed Enterprises*, ACM Trans. Information Systems, 14:4, October 1996, pp. 421–470.) These complete paths represent the system's interpretations of users' queries. Ambiguity exists when a statement is insufficient such that there are conflicting interpretations—multiple paths leading to different database objects—for the query. These multiple paths could be the result either from providing incomplete elements or from providing conflicting elements implied in the input, or both. Such are the cases easily taking place with truly natural articulation of database queries.

There are several different ways to handle ambiguity. First, the system employs a rich information model to maximize the chance with which the users would naturally choose its elements in their articulation. Second, the system uses keywords to capture the words in the natural articulation that the information model misses. It is worthwhile to reiterate that the information model is the roadmap (together with database values) for developing keywords at design time. These keywords represent multiple natural equivalents of terms used in the information model (and database values). As explained above, a rich information model not only lessens the burden of "scoring hit" on the keywords, it also greatly reduces the complexity of adding new keywords at the run time. Third, it accumulates cases of usage from actual operation and applies them to resolve remaining ambiguity when both information model and keywords are insufficient for a query. Interaction with the users is the last measure to sufficiently close the loop and finish the job. The NLI systematically involves users to provide the final resolution of ambiguity and confirmation of the result if needed. This learning also generates new cases and keywords and enhances the old cases.

The reference dictionary contains different interpretations related to the query; interpretations being represented by multiple paths leading to different database objects for the query. Thus, the reference dictionary allows the system to definitively measure and identify ambiguities, based on the following graphical model of the logical structure of the metadata.

Added to this basic logic is particular search strategies and additional search knowledge. Search includes the identification of all possible paths-interpretations (when ambiguity exists) and the evaluation of them. A search algorithm could follow a branch-and-bound strategy to minimize the space of search (limiting the number of possible paths to search). The development of bounds and branching rules would require a way to evaluate a given path with respect to the original natural query. A method for eliminating paths may also be used; that is, the system could infer contradiction based on the information model and perhaps operational rules (contextual knowledge) the reference dictionary contains. A method of optimization—inferring goodness of fit for the user—could be performed. Information about user's profile, concerned applications, and past cases are among the metadata that could be used form a basis to identify the most probable interpretations. Elimination is more conservative, but robust, than optimization because elimination places safety (correctness) first.

Three progressive levels of search and learn capabilities may be used. First, the system develops the most efficient way to enumerate all possible interpretations for a natural query (i.e., design a powerful reference dictionary). Second, it will develop evaluation methods to improve the performance of search (i.e., eliminate more paths early in the search process) over the basic method. Finally, the system also proactively suggests the best interpretation for the user (i.e., develop case-based reasoning and other heuristics). Learning methods may accompany these search strategies at all levels. The above ideas are illustrated below with a brief example.

Logical Structure: A Graphical Representation

The logical structure of the reference dictionary may be represented graphically according to one embodiment of the invention. Interpretations of a natural language query are defined on a graph G (Definition 1 below), abstracted from the (content of) reference dictionary. Given a natural language query Q (Definition 2), the natural language interface performs interpretation in several steps. It first determines all recognized terms (Definition 3) contained in Q and their corresponding recognized vertex sets (Definition 4) in G. It then identifies all query images (Definition 5) of Q on G. Since Q may be ambiguous (e.g., incomplete and multivalued mapping) to G, each of its recognized terms could correspond to multiple recognized vertices, resulting in multiple query images. Further, a recognized vertex may not always connect to other recognized vertices in a way covering a complete range of data semantics (database value, attribute, entity, and relationship) with a unique path. Therefore, it could have multiple semantic paths (Definition 6) covering multiple semantic domains (Definition 7). Taking these data semantics into account results in all possible query graphs for a query image, called feasible graphs (Definition 8). The refinement of feasible graphs leads to connected feasible graphs (Definition 9) and complete query graphs (Definition 10). A complete query graph represents an interpretation of the natural language query Q according to the logical structure G. The branch and bound algorithm searches implicitly all possible interpretations to determine the final query graph for execution.

Definition 1: The logical structure G is a graph <V, E>, where sets V and E are defined on the reference dictionary. In particular, V is a set of vertices of five types: subjects, entities, relationships, attributes, and values; and E is a set of their connection constraints (owner-member and peer-peer associations). Owner-member constraints belong to two types: subject-(sub)subject-entity/relationship-attribute-value and subject-attribute. Peer-peer constraints belong to three types: entity-entity, entity-relationship, and relationship-relationship.

Definition 2: A natural language query Q is a string of characters segmented by spaces.

Definition 3: A recognized term $t_i$ of Q is a segment of Q matching some keywords in the reference dictionary or some vertices in graph G.

Definition 4: A recognized vertex set of a recognized term $t_i$, $V_{t_i}$, is a set of vertices of G that matches $t_i$. A member of $V_{t_i}$ is a recognized vertex.

Definition 5: Given an n-recognized-term query where n< >0, a query image in graph G is a set of recognized vertices $v_i$ where i=1, ..., n and $v_i$ $V_{t_i}$, respectively.

Definition 6: A semantic path of a recognized vertex $v_i$ is a minimum set of vertices in G containing $v_i$ that satisfies the following conditions: it contains a subject vertex and its vertices are connected. The vertices it contains, other than $v_i$, are all implied vertices by $v_i$ to provide an interpretation (semantics) of $v_i$.

Definition 7: A semantic domain of a semantic path in graph G is a sub-graph of G that includes the semantic path, its member vertices, and edges connecting them.

Definition 8: A feasible graph of an n-recognized-vertex query image, where n< >0, is a collection of semantic domains $sd_i$ where i=1, ..., n and $sd_i$ is a semantic domain implied by a semantic path of recognized vertex $v_i$ of the query image.

Definition 9: A connected feasible graph is a connected sub-graph of G containing the feasible graph and a collection of entity/relationship vertices and edges in this graph. This collection is minimally sufficient to connect entity/relationship vertices of the feasible graph.

Definition 10: A query graph is a connected feasible graph. It represents an interpretation of a query that is definitive for a database query such as QBE and SQL to process the query.

Consider a Computer-Integrated Manufacturing system including three databases: order processing, process planning, and shop floor control. Suppose the system used the well-known TSER—Two Stage Entity-Relationship method (whose constructs include Application-Subject-Context-Entity-Relationship-Item described more in detail in the journal article entitled *Paradigm Translations in Integrating Manufacturing Engineering Using a Meta-Model: the TSER Approach*, by Cheng Hsu et al., J. Information Systems Engineering, 1:1, September 1993, pp. 325–352) to develop their information models and created a reference dictionary. These models became metadata instances stored in certain meta-entities and meta-relationships according to FIG. 1. The system had also included proper keywords and cases and stored them along with all database objects. Now, suppose a user made the following sample request, a problem of NLI: An enterprise user of a Computer-Integrated Manufacturing database could query the system such as: "I have asked you many times and I still have not heard a clear answer. Listen, I would like to know the status of my order. I want to know what models you have started working on and how many of them you have completed. I placed this order, I believe, sometime around the 20th of last December. Could you please help? Thanks."

A text scanning and information retrieval algorithm (described further below) may generate the result shown in Table 1 below.

TABLE 1

Recognized Terms and Possible Interpretations

| Terms | Possible Interpretations |
|---|---|
| status | (Item, SHOP_FLOOR.STATUS) |
| order | (Subject, ORDER) |
| | (EntRel, ORDER_PROCESSING.ORDER) |
| models | (EntRel, ORDER_PROCESSING.PART) |
| | (EntRel, SHOP_FLOOR.PART) |
| | (EntRel, PROCESS_PLAN.PART) |
| | (Subject, PART) |
| started working on | (Value, SHOP_FLOOR.STATUS) |
| completed | (Item, SHOP_FLOOR.NUM_COMPLETED) |
| 20$^{th}$ of last December | (Value, ORDER_PROCESSING.DATE_DESIRED) |

Ambiguity exists at terms "Order" and "Models" because each has multiple interpretations identified from the reference model. Otherwise, the result is definitive (forming a unique overall path) and could be mapped to the Metadatabase Query Language (MQL).

In this particular query, the information model would be sufficient to sort out the ambiguity and suggest a unique, optimal interpretation for these terms, and hence for the natural query. Still, cases could also be used either to confirm or to assist the resolution of ambiguity. However, there may be another kind of ambiguity in the input; the user indicated "around" 20th of last December in the original natural query. Because of this ambiguity, the user may find the final answer less than satisfactory. The system generally would have no method for interpreting correctly this piece of input since the user herself was ambivalent about it. There may be, in this instance, no proper solution other than to leaving the interpretation to the user. The final answer (based on 12/20/1999) may represent the best point estimation for the user's fuzzy interval of possibilities. The user would be presented with a chance to comment on this estimate and to request new dates for another query if wanted. Interaction with the user concerning this estimate, in its own right, could add valuable cases to the system so that it could provide more help for uncertain users when the term "around" is encountered in a following query, which is also a part of learning.

The following is an example algorithm for identifying meaningful terms:

```
Let m = number of words of input string
Let OrderedTerm = ( )
Let n = 1
Do while (n <= m)
    Search in OrderedTerm for Input SubString starts at n-th position
    If (Term is found with length 1),
    Then
        Let n = 1 + 1
    Else
        Search in the dictionary for Input SubString starts at n-th position
        If (Term is found with length 1),
        Then
            Let Term = 1-words string
            Retrieve meaning sets of the Term
```

-continued

```
Insert OrderedTerm with the Term
  Let n = 1 + 1
Else
  Let n = n + 1
End if
End if
End do while
```

The application of cases—i.e., matching a query with a case—is based on the vector space model as is known in the art. Two binary vectors represent a case (C) and a query (Q); and their COSINE measure indicates the goodness of fit. Below is an algorithm applying cases to the resolution of ambiguity in terms.

Retrieve cases containing the similar situation
If there are retrieved cases,

```
Then
Let similar_value = 0
For each retrieved case
  Let the base set for meaning space = set of meaning of terms of query
  For each meaning of case
    Update the base set
  End for each
  Form a term space as an ordered n-tuples of terms /* n is a number of
terms in the base set */
  Form a binary vector for query (Q) corresponding to the meaning space
  Form a binary vector for case (C) corresponding to the meaning space
  Compute COSINE similarity: COSINE (Q, C) = (Q.C)/(|Q|)(|C|)
  If COSINE (Q, C) > similar_value,
  Then
    Let the solution case = the current case
    Let similar_value = COSINE (Q,C)
  End if
End for each
If similar_value > accepted_value,
Then
  Determine the meaning of the ambiguous term from the solution case
End if
End if
```

Finally, when ambiguities are resolved, the complete list of path information becomes the sufficient input for the underlying database query language. In this example, we show the MQL statements, which may function on top of a standard SQL facility.

FROM OE/PR WO_SEQ GET STATUS
FROM SUBJECT ORDER GET CUST_ORDER_ID, DATE_DESIRED,
OD_STATUS, CUST_ID, ORDER_LINE_ID, PART$_{13}$ID, QUANTITY,
DATE_SCHED, OI_STATUS, DESCRIPTION, COST
FROM OE/PR WK_ORDER GET NUM_COMPLETED
FOR STATUS='START WORKING ON'
AND DATE_DESIRED='12/20/1999';

The mapping performs processing in order to determine the GET lists and some conditions (such as AND/OR). However, at this point, the reference model would have all information needed to perform the query.

A complete sequence of graphs generated from this list is shown in FIGS. 7–17 and is described in more detail below. Query images and feasible graphs are intermediate vertices while query graphs are terminal vertices.

According to one embodiment of the invention, a branch and bound algorithm is provided, including the optimal search strategies and evaluation rules. A reliable idea is to use a method of elimination; that is, the system could infer contradiction based on the information model and operational rules (contextual knowledge) to remove certain interpretations. The method of optimization—inferring goodness of fit for the user—could be another possibility. Information such as user profile, concerned applications, and past cases is among the metadata that could help identify the most probable interpretations. A method is provided to enumerate all possible interpretations for a natural query, the optimal evaluation methods to improve the performance of search, and case-based reasoning and other heuristics to enhance user-feedback and assure closure.

Branch and Bound Algorithm

Consider the basic algorithm shown below. An interpretation problem is formulated as an optimization problem with objective function $z(t)$ where t is a terminal vertex. A goal is to minimize $z(t)$ with respect to graph G. An evaluation function $LB(v)$ finds the lower bound for an intermediate vertex v, so that the search could either fathom all paths starting with v, or pick the most promising v to explore in more detail. According to one embodiment of the invention, the evaluation embodies operating rules and heuristics. Note that the search is complete; i.e. there always exists an optimal solution in the search space and the search will find it.

Below is an example branch and bound algorithm that may be used according to one embodiment of the invention:

```
Let current_best_LB = MAX_NUMBER
Let current_LB = 1
Insert root into priority queue//the least lower bound element is always in
the first position
While (current_best_LB >= current_LB) {
  Let current_vertex = the first element of priority queue
  Remove the first element from priority queue
  Let min_successor_LB = MAX_NUMBER
  Let successor_set = branch (current_vetrex)
  //branch( ) return with successor's LB or z( )
  For each successor in successor_set {
    If (successor is not a terminal vertex) {
      Insert successor into priority queue}
    If (LB(successor) < min_successor_LB) {
      Let min_successor_LB = LB(successor)}
  }
  For each successor in successor_set {
    If (min_successor_LB = LB(successor) {
      If (successor is not a terminal vertex) {
        Let current_LB = min_successor_LB }
      else {
        If (min_successor_LB <= current_best_LB ) {
          If (min_successor_LB < current_best_LB ) {
            Remove all elements of solution set }
          Insert successor into solution set
          Let current_best_LB = min_successor_LB }
      }
    }
  }
}
```

Case-Based Reasoning

The basic design of cases is discussed above with respect to the reference dictionary. The application of cases—i.e., matching a query with a case—is based on the vector space model. Two binary vectors represent a case (C) and a query (Q); and their COSINE measure indicates the goodness of fit.

Below is an example procedure for measuring Cosine similarity:

```
Procedure cosine_simialarity (Q, C) {
/* Q and C are in terms of recognized vertices */
    Let base_set = Q ∪ C
    Let U=binary_vector(Q)
    /* function binary_vector (Q) returns a binary vector based on
    base_set*/
    Let V=binary_vector(C)
    /* function binary_vector (C) returns a binary vector based on
    base_set*/
            Return (U.V)/(|U|)(|V|)
        }
```

According to another embodiment of the invention, an NL system processes an input according to a series of steps. For example, the NL system may accept an input (such as a query string), determine recognized terms and their vertices, and determine minimal recognized terms and their minimal recognized vertices. The NL system may then search for minimum cost query graphs, eliminate redundant solutions and determine complete solutions, and translate these complete solutions to query language statements. The following are a series of steps and algorithms that may be used to interpret an input database query.

Main Algorithm:

Step 1: Determine recognized terms and their recognized vertices (Algorithm 1)

Step 2: Determine minimal recognized terms and their minimal recognized vertices (Algorithm 2)

Step 3: Search for minimum cost query graphs (Algorithm 3)

Step 4: Remove redundant solutions (Algorithm 4)

Step 5: Determine complete solutions (Algorithm 5)

Step 6: Translate to SQL statement

Algorithm 1: Determine recognized terms and their recognized vertices

```
Determine from input string, an ordered N-tuple I = (w₁, w₂, . . . , w_N)
        where w is a word and N is a number of words
wordIndex = 1
        While (wordIndex < N) {
        Search in list of existing recognized terms
                for a string constructed from (w_wordIndex , w_wordIndex+1 , · · · ,
        w_wordIndex+L−1 ) with one space as a delimiter where L is the length
        of maximum-length matching string
If (substring is found) {
    wordIndex = wordIndex + L}
Else {
    Search in the dictionary
            for a string constructed from (w_wordIndex , w_wordIndex+1 , · · · ,
                    w_wordIndex+L−1 ) with one space as a delimiter where
            L is the length of maximum-length matching string
    If (substring is found) {
        Insert founded substring into term list
        Insert meanings of found substring into meaning list
        wordIndex = wordIndex + L }
    Else {Let wordIndex = wordIndex + 1}
    }
}
```

Algorithm 2: determine minimal recognized terms and their minimal recognized vertices

```
For each recognized term {
    If (number of its recognized vertices) > 1 {
        For each recognized vertex {
            If (the recognized vertex belongs to a recognized vertex of the
            term)
                {Eliminate the recognized vertex}
        }
    }
}
For each recognized term {
    If (the number of recognized vertices > 1){
        For each recognized vertex {
            If (the recognized vertex is not attribute or value vertex
            and it belongs to a recognized vertex of other terms) {
                Eliminate the recognized vertex
            }
        }
    }
If (all recognized vertices of that term are eliminated) {
    Eliminate this term
}
}
```

Figure 5:
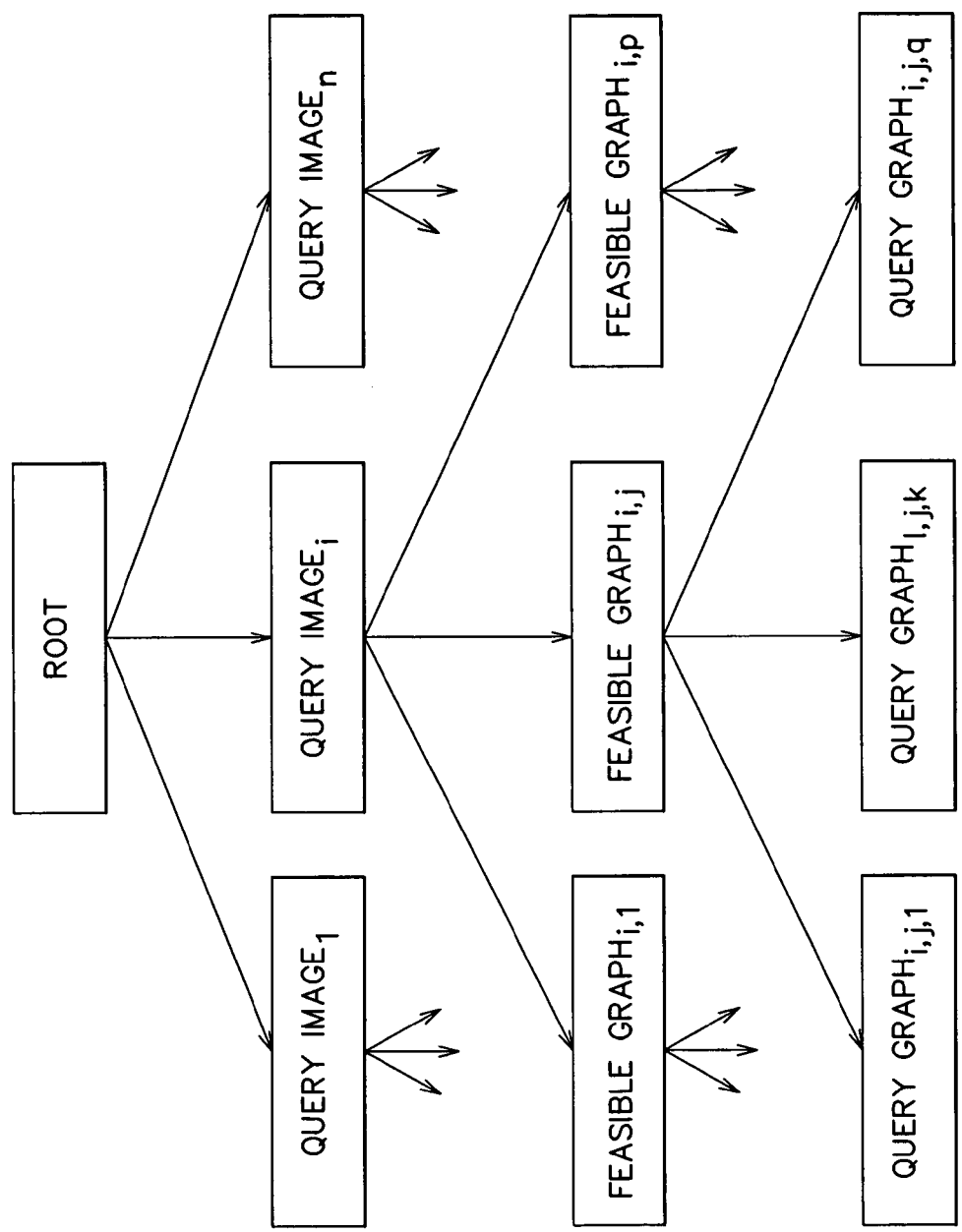
FIG. 5 shows an example complete search graph in accordance with one embodiment of the invention.

FIG. 5 shows an example complete search graph having a number of query images, query graphs, and feasible graphs arranged in a hierarchical structure.

Algorithm 3: Search for minimum cost query graphs (query graph containing minimum vertices)

```
Let current_best_LB = MAX_NUMBER
Insert root into priority queue//the least lower bound element is always in
the first position
Let current_vertex = the first element of priority queue
Remove the first element from priority queue
Let current_LB = LB(the first element of priority queue)
While (current_best_LB >= current_LB) {
    Let min_successor_LB = MAX_NUMBER
    Let successor_set = branch (current_vetrex) //Algorithm 3.1
    //branch( ) return with successor's LB or z( )
    For each successor in successor_set {
        If (successor is not a terminal vertex) {
            Insert successor into priority queue}
            If (LB(successor) < min_successor_LB) {
                Let min_successor_LB = LB(successor)}
    }
    For each successor in successor_set {
        If (min_successor_LB = LB(successor) {
            If (successor is not a terminal vertex) {
                Let current_LB = min_successor_LB
            } else {
                If (min_successor_LB <= current_best_LB ) {
                    If (min_successor_LB < current_best_LB ) {
                        Remove all elements of solution set }
```

```
            Insert successor into solution set
            Let current_best_LB = min_successor_LB }
        }
    }
}
if (the priority queue is not empty) {
    Let current_vertex = the first element of priority queue
    Remove the first element from priority queue
} else {
    current_lb = MAX_NUMBER
    }
}
```

Algorithm 3.1: Branching procedure

```
Procedure branch (current vertex) {
    Let successor set is an empty set
    Case: the current vertex is the root {
        Determine query images
        For each query image {
            Determine LB of query image
        }
        Add all query images to successor set
    }
    Case: the current vertex is a query image {
        Determine feasible graphs
        For each feasible graph {
            Determine LB of feasible graph
        }
        Add all feasible graphs to successor set
    }
    Case: the current vertex is a feasible graph {
        Determine query graphs
        For each query graph {
            Determine cost of query graph
        }
        Add all query graphs to successor set
    }
    Return successor set
}
```

Algorithm 5: Determine complete solutions

```
for each solution {
    determine target attribute list
    determine er set
    determine join condition
    determine selection condition
}
```

Application of the above algorithms to an input query is more clearly illustrated by the following example:

Example Query: Get order_id, model, wo_quan, and num_completed of John Smith's orders.

First, the NL system determines recognized terms and their vertices. Below are example recognized terms and vertices corresponding to the example query above.

| Term | Vertex |
|---|---|
| ORDER_ID | I sfcl_17 |
| MODEL | I opsl_100 |
|  | I ppsl_54 |
|  | I sfcl_5 |
| WO_QUAN | I sfcl_6 |
| NUM_COMPLETED | I sfcl_20 |
| JOHN SMITH | V opsl_90|John Smith |
| ORDERS | S ORDER |

From the recognized terms and vertex sets are determined minimal recognized terms and corresponding minimal vertex sets. Below is an example set of minimal recognized terms and minimal vertex sets according to the example.

| Term | Vertex |
|---|---|
| ORDER_ID | I sfcl_17 |
| MODEL | I opsl_100 |
|  | I ppsl_54 |
|  | I sfcl_5 |
| WO_QUAN | I sfcl_6 |
| NUM_COMPLETED | I sfcl_20 |
| JOHN SMITH | V opsl_90|John Smith |
| ORDERS | S ORDER |

Figure 6:
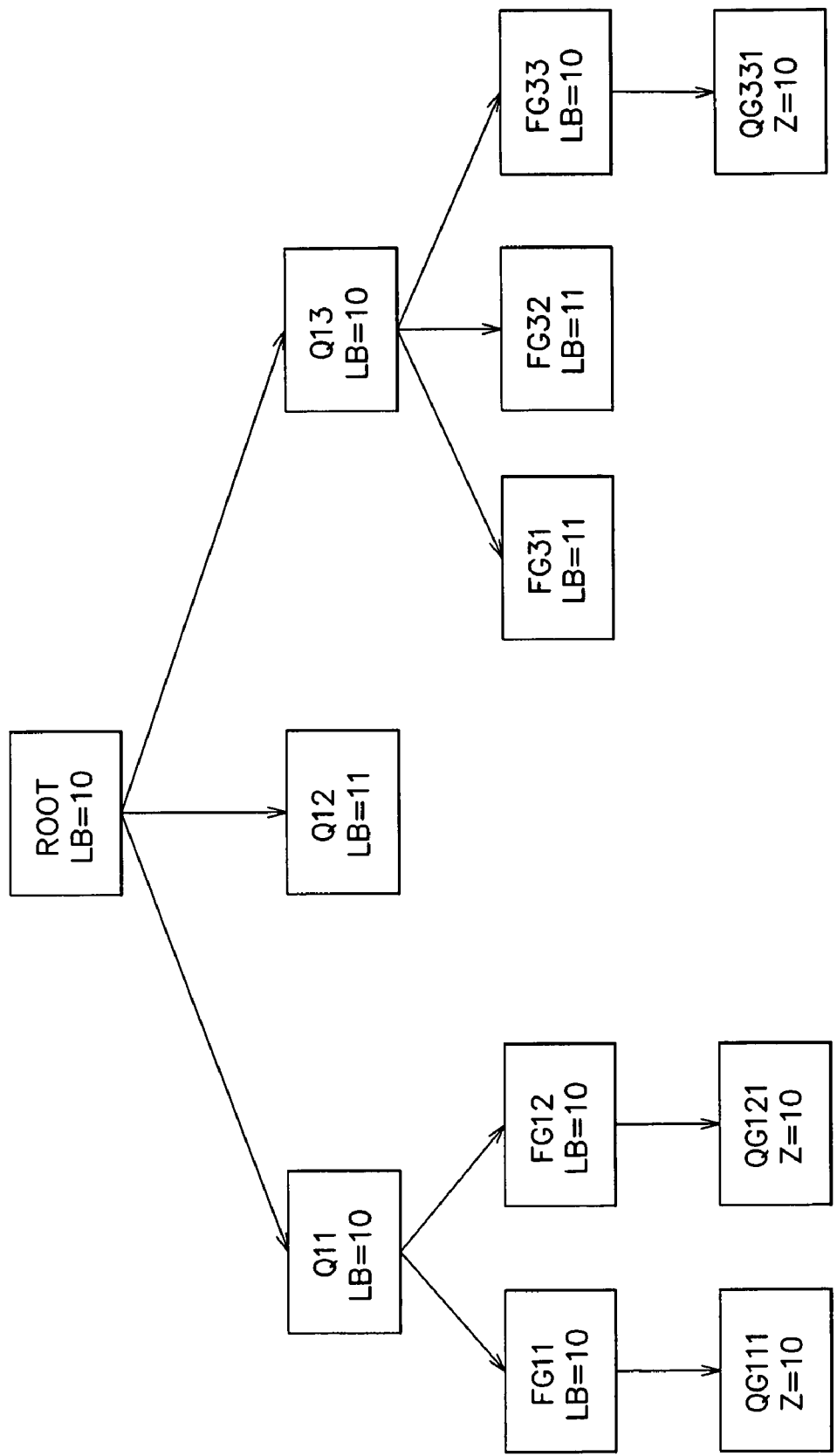
FIG. 6 shows an example search graph in accordance with one embodiment of the invention.

Applying algorithm 3, above, the query graph having the minimum vertices is located. A search graph corresponding to the example appears in FIG. 6.

Result from Branching Procedure

Query Images and their lower bounds:

Query Image 1: {I sfcl_17, I opsl_100, I sfcl_6, I sfcl_20, V opsl_90|John Smith, S ORDER}

LB=10

Figure 7:
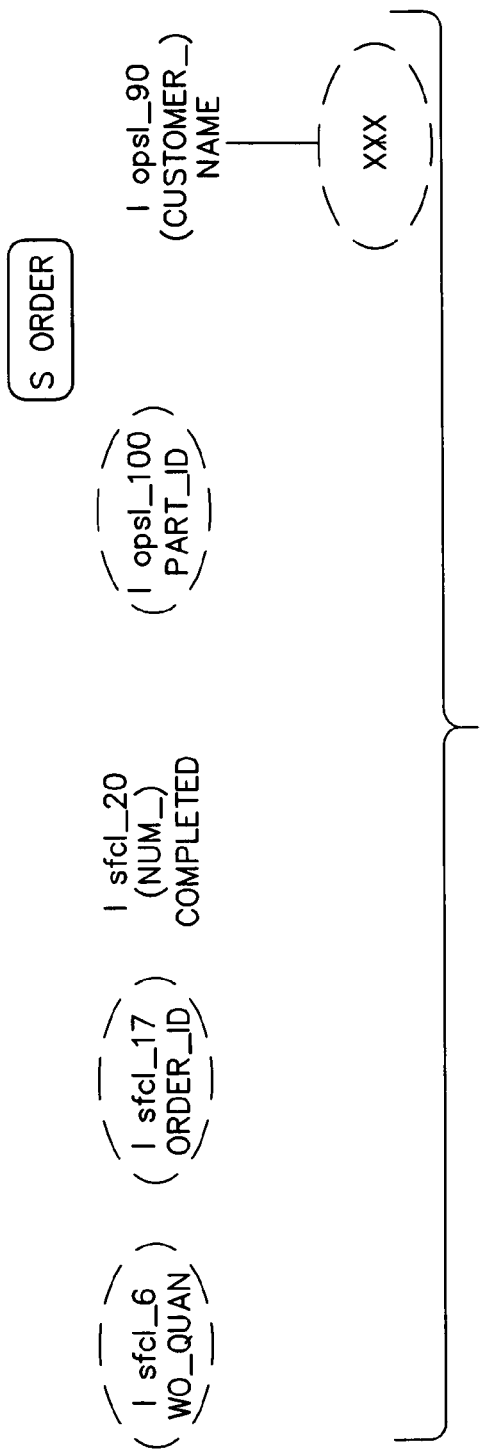
FIG. 7 shows an example query image in accordance with one embodiment of the invention.

A corresponding query image is shown in FIG. 7.

Query Image 2: {I sfcl_17, I ppsl_54, I sfcl_6, I sfcl_20, V opsl_90|John Smith, S ORDER}

LB=11

Figure 8:
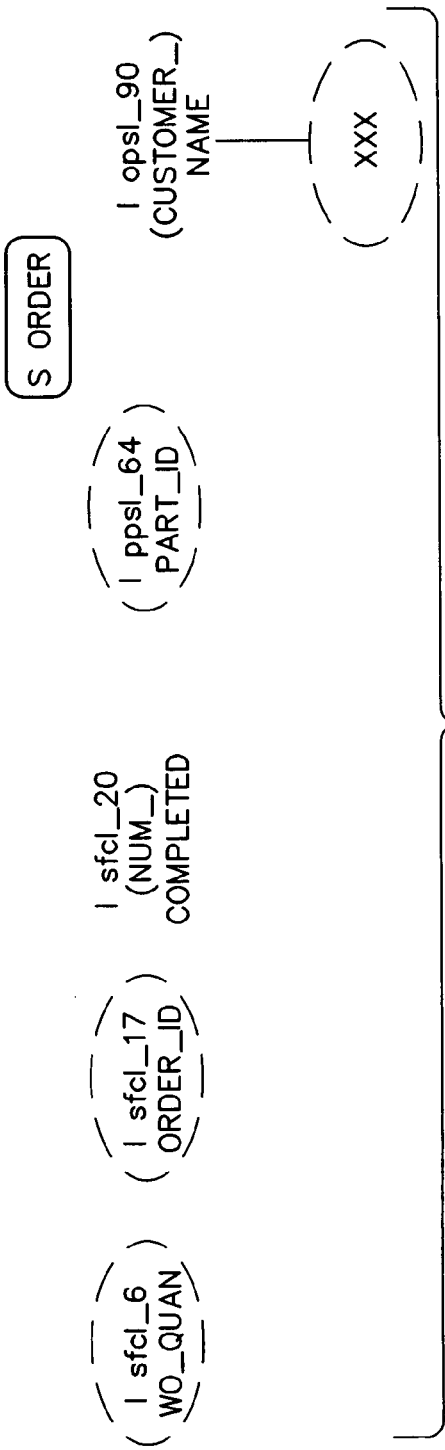
FIG. 8 shows an example query image in accordance with one embodiment of the invention.

A corresponding query image is shown in FIG. 8.

Query Image 3: {I sfcl_17, I sfcl_5, I sfcl_6, I sfcl_20, V opsl_90|John Smith, S ORDER}

LB=10

Figure 9:
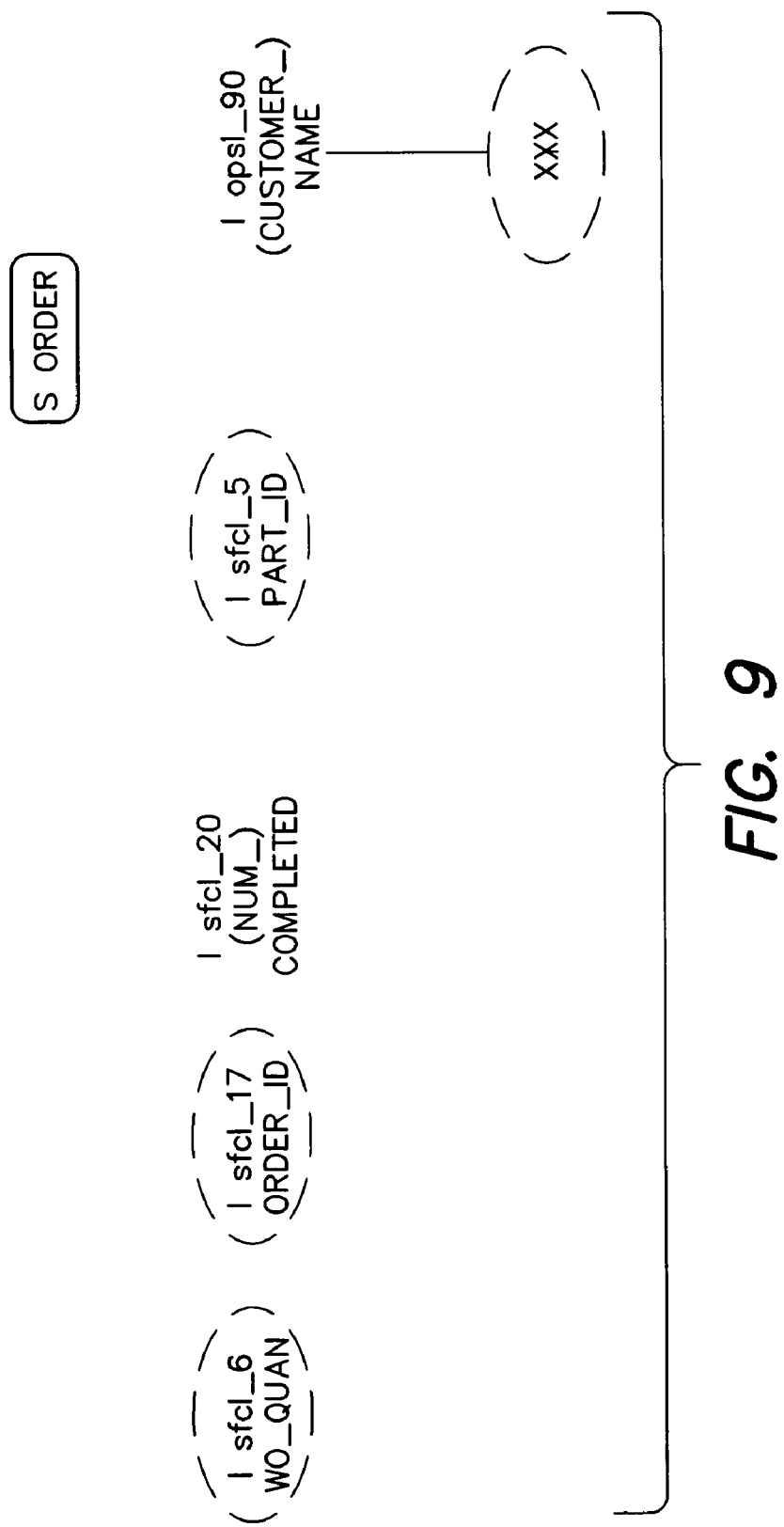
FIG. 9 shows an example query image in accordance with one embodiment of the invention.

A corresponding query image is shown in FIG. 9.

Feasible Graphs and their lower bounds:

Feasible Graph 1 of Query Image 1:

```
ErSet =
{ WORK_ORDER, PART, ORDER_ITEM, ORDER_HEADER, CUSTOMER }
    Item_Er_set = {( I sfcl_6, WORK_ORDER), (I opsl_100,
ORDER_ITEM), (I sfcl_17, WORK_ORDER), (I sfcl_20, WORK_ORDER) }
Value_Er_set = {( V opsl_90|John Smith, CUSTOMER)}
LB = 10
```

Figure 10:
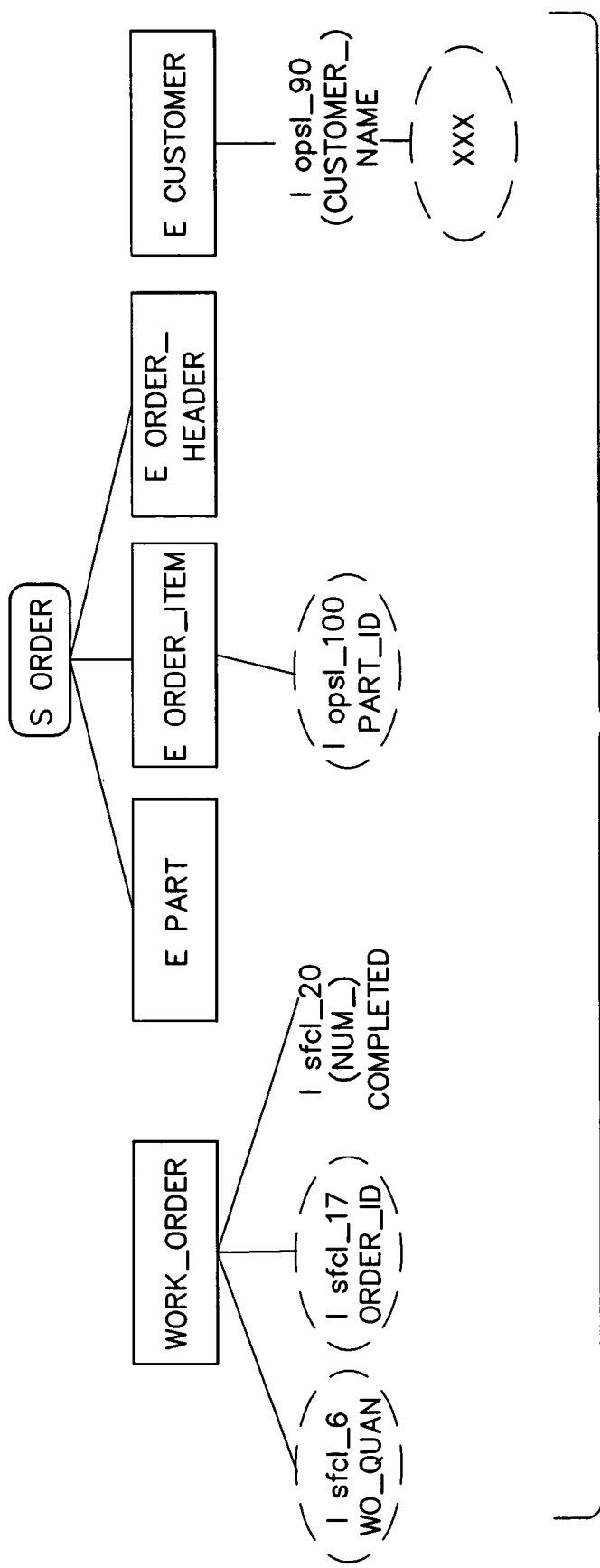
FIG. 10 shows an example feasible graph in accordance with one embodiment of the invention.

A corresponding feasible graph is shown in FIG. 10.
Feasible Graph 2 of Query Image 1:

ErSet =
{ WORK_ORDER, PART, ORDER_ITEM, ORDER_HEADER, CUSTOMER }
Item_Er_set = {( I sfcl_6, WORK_ORDER), (I opsl_100, PART), (I sfcl_17, WORK_ORDER), (I sfcl_20, WORK_ORDER) }
Value_Er_set = {( V opsl_90|John Smith, CUSTOMER)}
LB = 10

Figure 11:
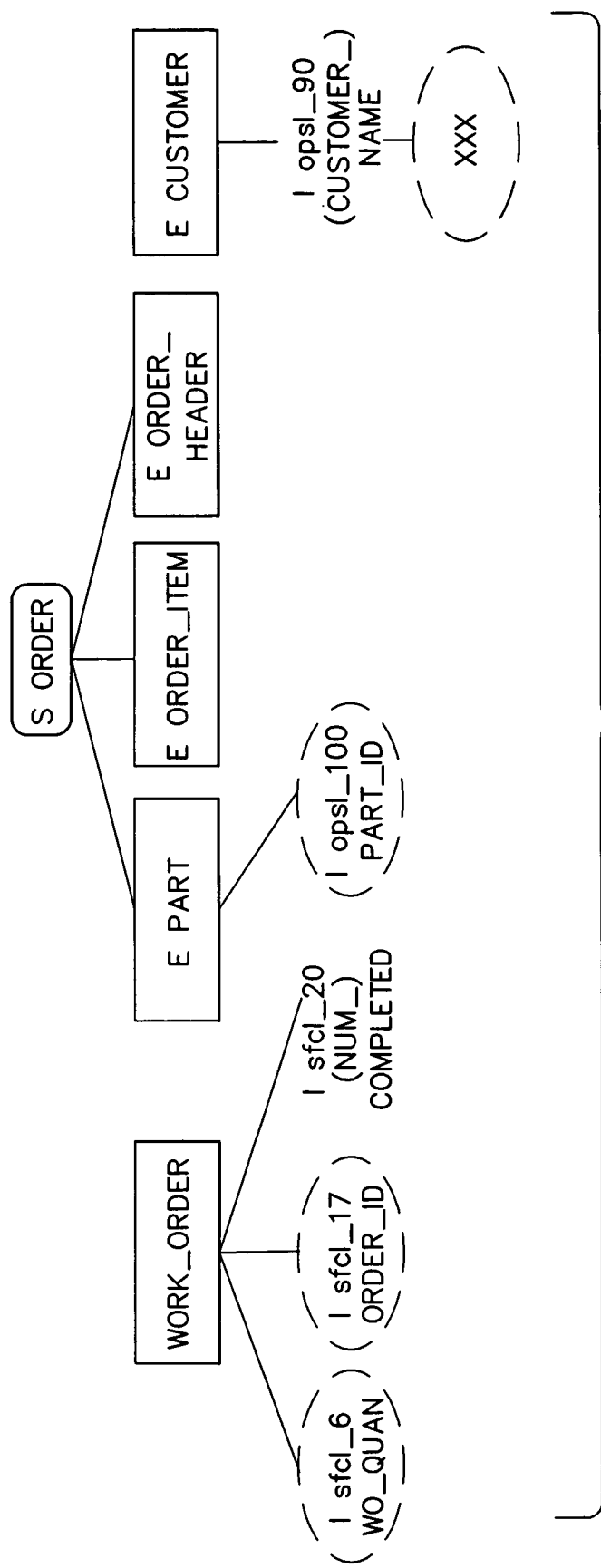
FIG. 11 shows an example feasible graph in accordance with one embodiment of the invention.

A corresponding feasible graph is shown in FIG. 11.
Feasible Graph 1 of Query Image 3:

ErSet =
{ WORK_ORDER, PART, ORDER_ITEM, ORDER_HEADER, CUSTOMER }
Item_Er_set = {( I sfcl_6, WORK_ORDER), (I sfcl_5, OPERATOR), (I sfcl_17, WORK_ORDER), (I sfcl_20, WORK_ORDER) }
Value_Er_set = {( V opsl_90|John Smith, CUSTOMER)}
LB = 11

Figure 12:
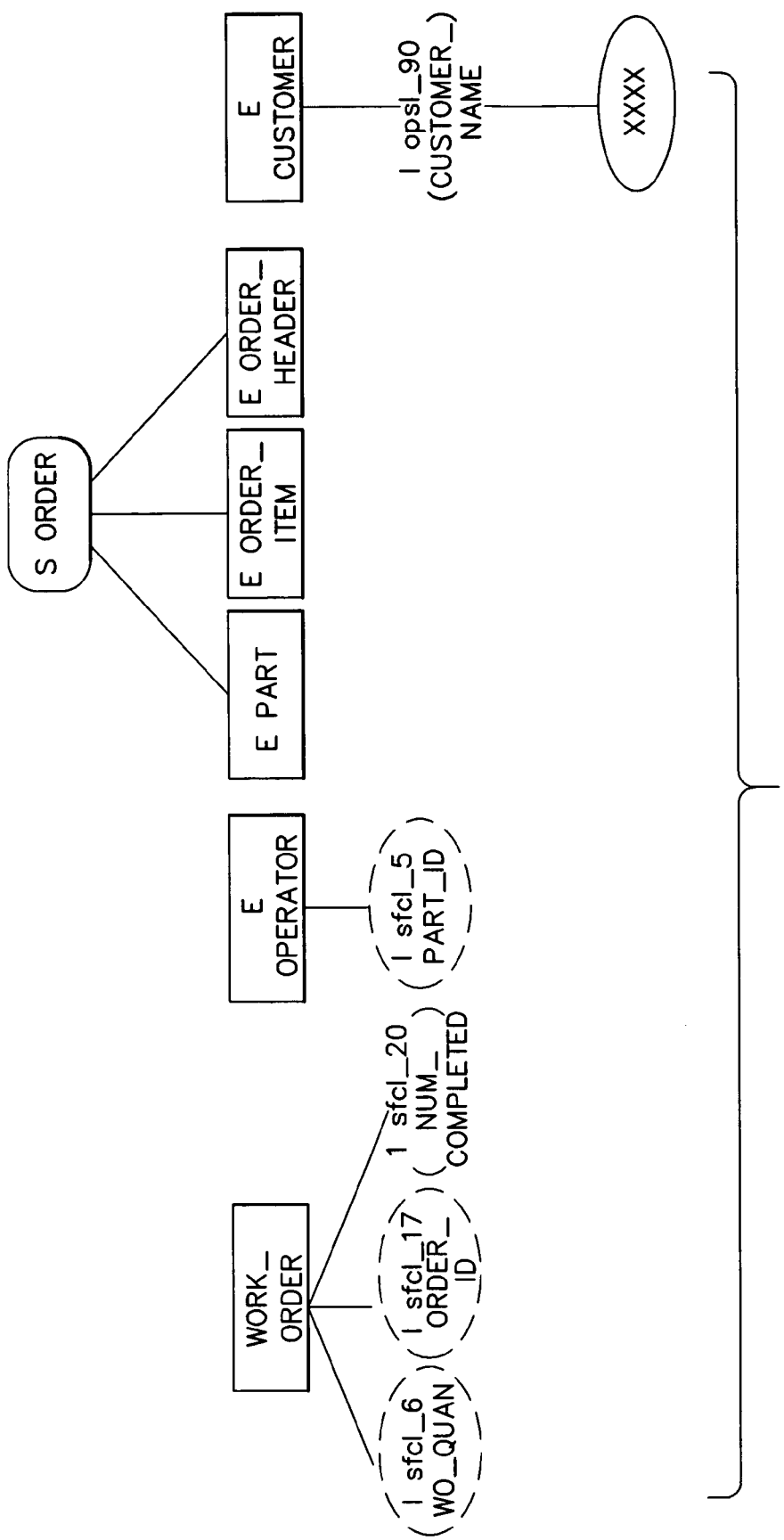
FIG. 12 shows an example feasible graph in accordance with one embodiment of the invention.

A corresponding feasible graph is shown in FIG. 12.
Feasible Graph 2 of Query Image 3:

ErSet =
{ WORK_ORDER, PART, ORDER_ITEM, ORDER_HEADER, CUSTOMER }
Item_Er_set = {( I sfcl_6, WORK_ORDER), (I sfcl_5, PARTS_AVAIL), (I sfcl_17, WORK_ORDER), (I sfcl_20, WORK_ORDER) }
Value_Er_set = {( V opsl_90|John Smith, CUSTOMER)}
LB = 11

Figure 13:
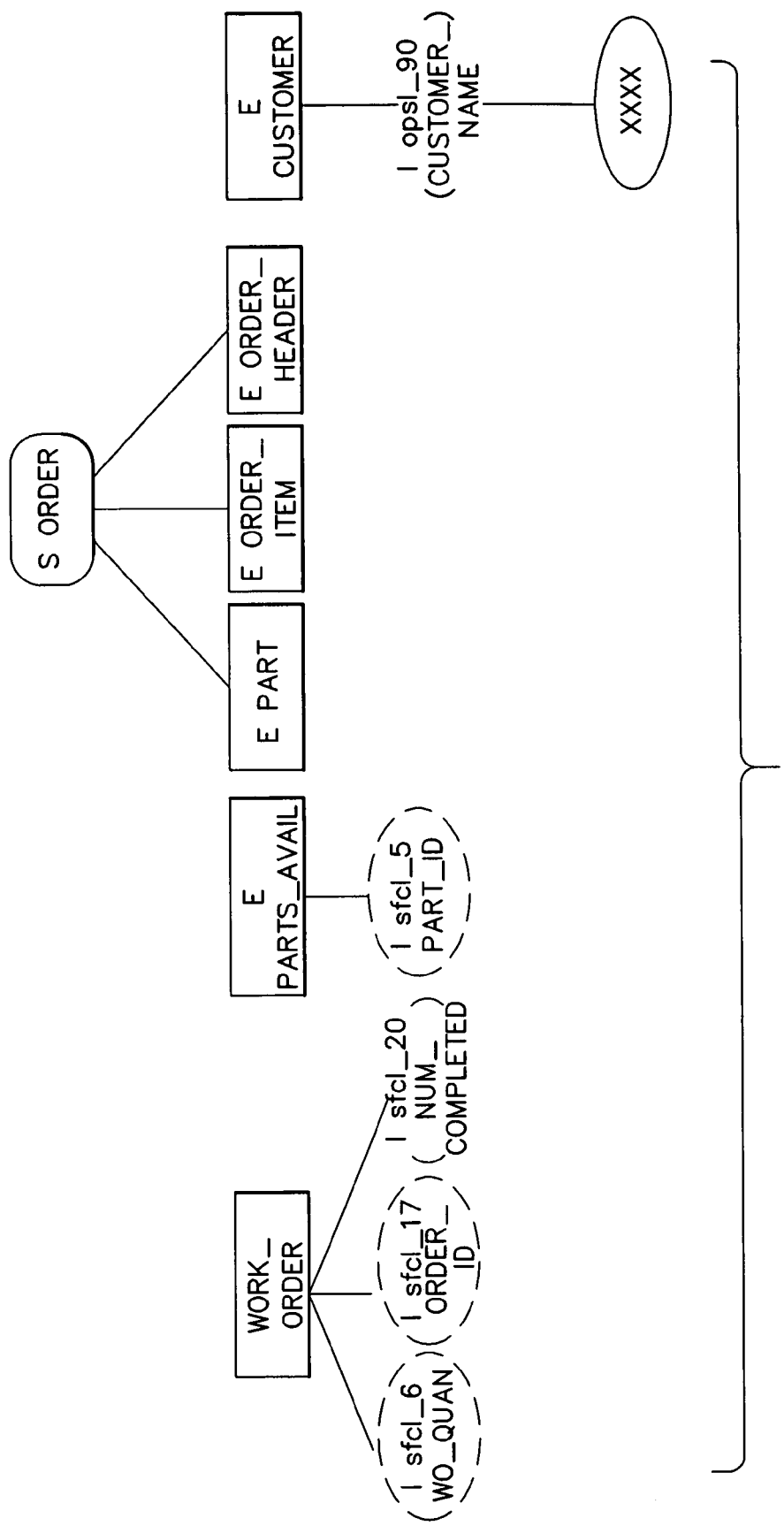
FIG. 13 shows an example feasible graph in accordance with one embodiment of the invention.

A corresponding feasible graph is shown in FIG. 13.
Feasible Graph 3 of Query Image 3:

ErSet =
{ WORK_ORDER, PART, ORDER_ITEM, ORDER_HEADER, CUSTOMER }
Item_Er_set = {( I sfcl_6, WORK_ORDER), (I sfcl_5, WORK_ORDER), (I sfcl_17, WORK_ORDER), (I sfcl_20, WORK_ORDER) }
Value_Er_set = {( V opsl_90|John Smith, CUSTOMER)}
LB = 10

Figure 14:
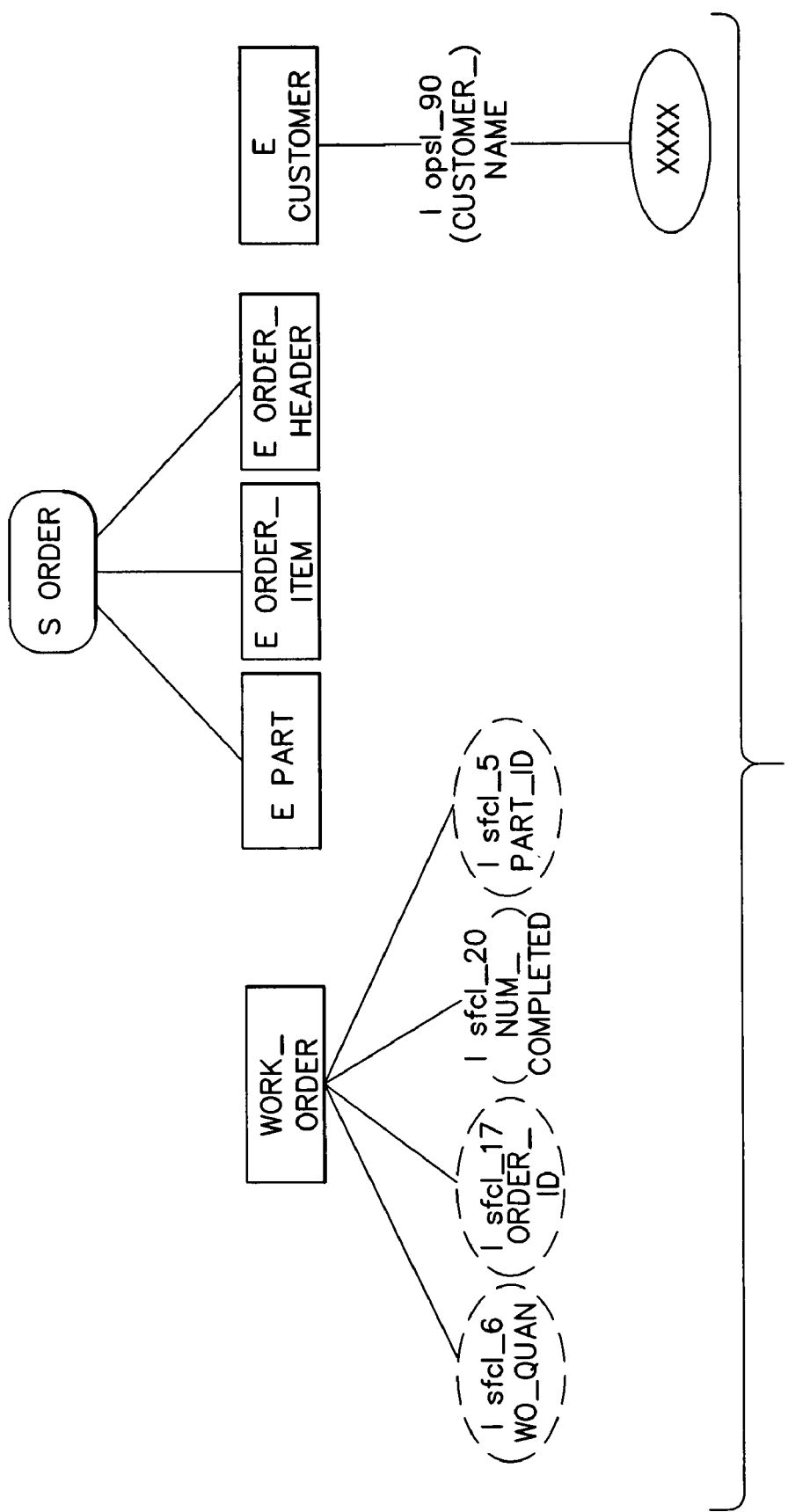
FIG. 14 shows an example feasible graph in accordance with one embodiment of the invention.

A corresponding feasible graph is shown in FIG. 14.
Query Graphs and their minimum vertices:

ErSpSet = { WORK_ORDER, PART, ORDER_ITEM, ORDER_HEADER, CUSTOMER }
Item_Er_set = {( I sfcl_6, WORK_ORDER), (I opsl_100, ORDER_ITEM), (I sfcl_17, WORK_ORDER), (I sfcl_20, WORK_ORDER) }
Value_Er_set = {( V opsl_90|John Smith, CUSTOMER)}
Z = 10

Figure 15:
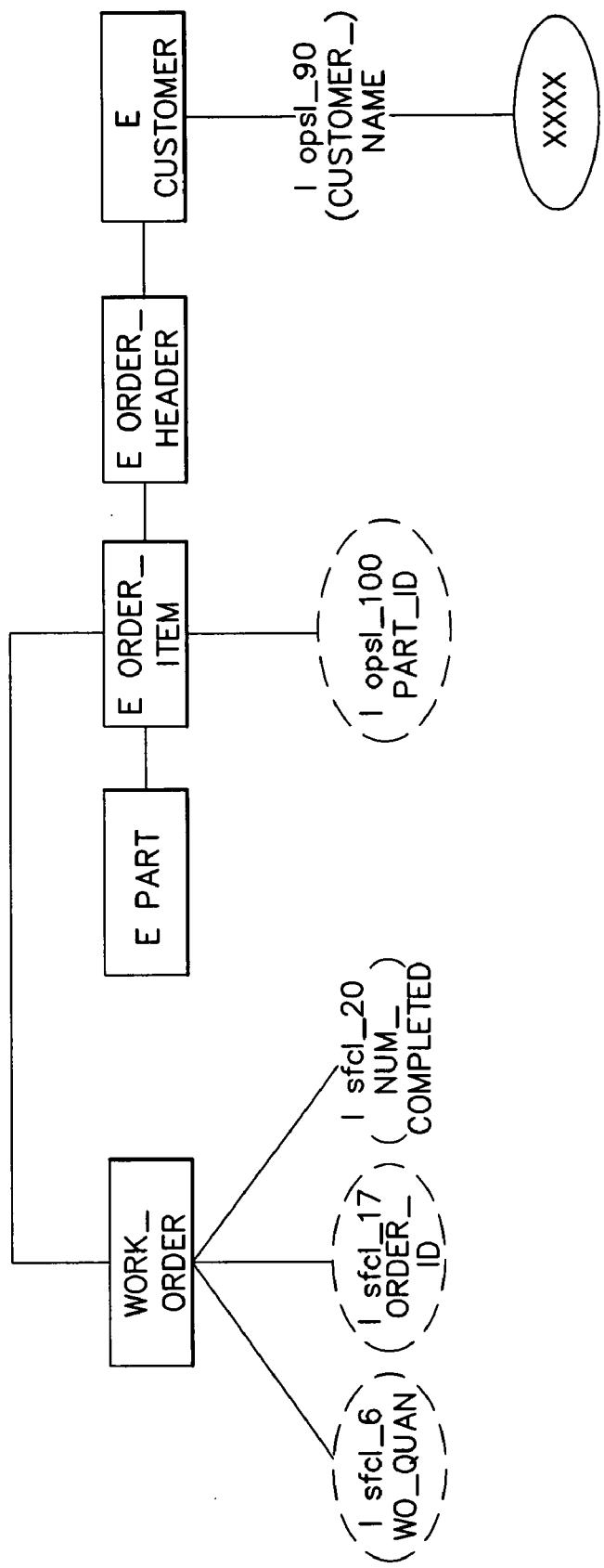
FIG. 15 shows an example query graph in accordance with one embodiment of the invention.

A corresponding query graph is shown in FIG. 15.
Query Graph 1of FG 12:

```
    ErSpSet = { WORK_ORDER, PART, ORDER_ITEM,
ORDER_HEADER, CUSTOMER }
Item_Er_set = {( I sfcl_6, WORK_ORDER), (I opsl_100, PART), (I sfcl_17,
WORK_ORDER), (I sfcl_20, WORK_ORDER) }
Value_Er_set = {( V opsl_90|John Smith, CUSTOMER)}
Z = 10
```

Figure 16:
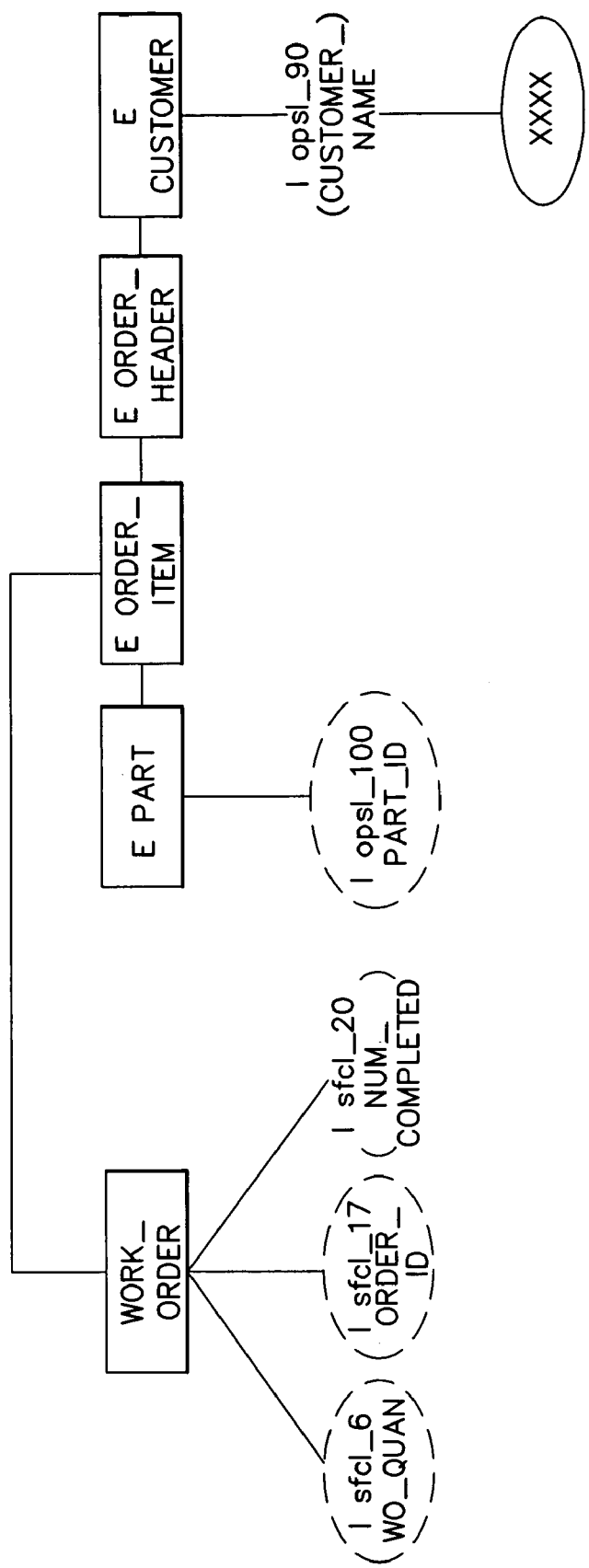
FIG. 16 shows an example query graph in accordance with one embodiment of the invention.

A corresponding query graph is shown in FIG. 16.
Query Graph 1of FG 33:

```
    ErSpSet = { WORK_ORDER, PART, ORDER_ITEM,
  ORDER_HEADER, CUSTOMER }
       Item_Er_set = {( I sfcl_6, WORK_ORDER), (I sfcl_5, WORK_ORDER),
  (I sfcl_17, WORK_ORDER), (I sfcl_20, WORK_ORDER) }
  Value_Er_set = {( V opsl_90|John Smith, CUSTOMER)}
  Z = 10
```

Figure 17:
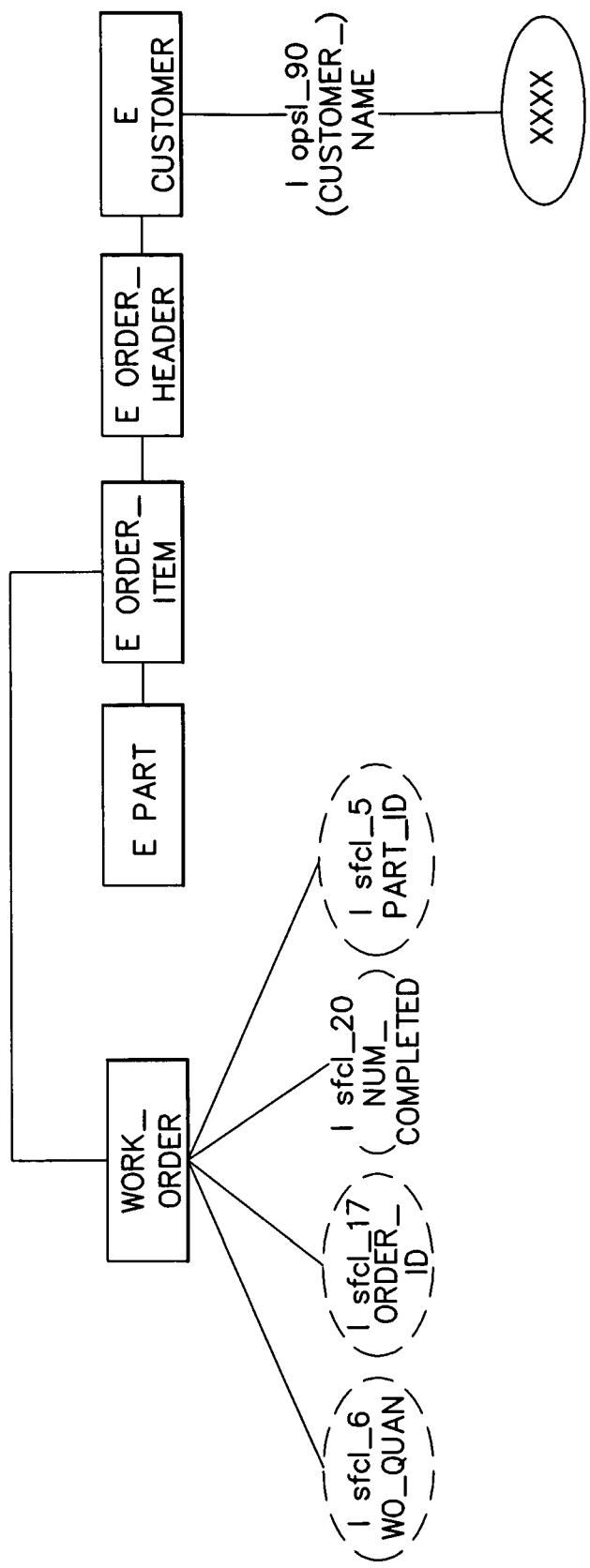
FIG. 17 shows an example query graph in accordance with one embodiment of the invention.

A corresponding query graph is shown in FIG. 17.
Solution Set:
   Solution 1: Query graph 1of FG33
   Solution 2: Query graph 1of FG12
Solution 3: Query graph 1of FG11
Solution Set after removing redundancy:
   Solution 1: Query graph 1of FG33
The Complete solution is:

```
        Attribute list = { WORK_ORDER.ORDER_ID,
  WORK_ORDER.PART_ID, WORK_ORDER.WO_QUAN,
  WORK_ORDER.NUM_COMPLETED}
  ER list = { WORK_ORDER, PART, ORDER_ITEM,
         ORDER_HEADER, CUSTOMER }
  JC = "PART.PART_ID =WORK_ORDER.PART_ID and
         WORK_ORDER.WO_ID=WO_SEQ.WO_ID and
         WORK_ORDER.ORDER_ID=ORDER_ITEM.ORDER_LINE_ID and
         ORDER_ITEM.CUST_ORDER_ID=
         ORDER_HEADER.CUST_ORDER_ID"
         SC = "(CUSTOMER.CUST_NAME = 'John Smith')"
```

An SQL statement corresponding to the complete solution above is:

```
       SELECT WORK_ORDER.ORDER_ID,
              WORK_ORDER.PART_ID, WORK_ORDER.WO_QUAN,
              WORK_ORDER.NUM_COMPLETED
       FROM WORK_ORDER, PART, ORDER_ITEM, ORDER_HEADER,
  CUSTOMER
       WHERE ORDER_ITEM.ORDER_LINE_ID=WORK_ORDER.ORDER_ID and
             ORDER_ITEM.PART_ID=PART.PART_ID and
             ORDER_ITEM.CUST_ORDER_ID =
                ORDER_HEADER.CUST_ORDER_ID and
             ORDER_HEADER.CUST_ID=CUSTOMER.CUST_ID and
             (CUSTOMER.CUST_NAME = 'John Smith');
```

According to one embodiment of the invention, a search-and-learn approach is described in more detail below. A particular enterprise database (or distribution of databases) necessarily has only a finite number of database objects, including data types, data instances, and database computational operators (also referred to as database values). They give rise to only a finite number of possible permutations. All meaningful queries must ultimately refer to these database objects and the articulation of any queries must correspond to some of these permutations. When the system identifies the permutations implied, it has interpreted the query. Then, it has to be able to map the query to the underlying database query language (such as SQL) without having to understand linguistically the human meaning of the words and phrases used. Generic natural language processing is fundamentally different since the possible permutations in the latter case are virtually infinite. Of course, even the relatively small, finite number of database objects could in theory generate a large number of possible permutations. Moreover, truly natural articulation could plausibly defy the pre-determined conventions of the databases in the following basic ways:
  (1) Use other words and phrases than those captured in the database to refer to these basic objects (e.g., 4$^{th}$ of July instead of 7/4 and "buyer" rather than "customer");
  (2) Leave its reference to these objects undefined (e.g., the precise nature and condition of the reference or objects); and
  (3) Be implicit in the articulation (e.g., incomplete or convoluted input).

All these cause ambiguity, and the system might not be able to identify any database object or permutation at all. In the worst case, the system would have to search the entire space of possible permutations and evaluate each of them for the user to determine which one is correct. From this point on, every (additional) database object the system recognized would serve to eliminate certain space from the search and narrow down the remaining possible interpretations. In the best case, the system would quickly identify a single complete permutation and determine immediately a unique, correct interpretation for the user. In this context, one could consider the understanding-based approaches as the best case all the time. But the implicit enumeration-evaluation approach assumes the more realistic middle road, aiming to avoid the worse case and approaches as closely as possible the best case. The task, rather, is one of developing good search methods to represent and characterize distinct possibilities and to optimize interpretations. The challenge is to analyze ambiguity and turn it into a problem that can be handled systematically.

Various concepts related to search and learn is described in more detail below. Section 1 introduces a basic model of the reference dictionary as a graph of complete interpretations of natural language queries for use in enterprise databases and as a resource for resolving ambiguity. The graph incorporates four resource layers (database values, information models, keywords, and cases). Section 2 describes a search and learn process that identifies a single and complete interpretation (path) for a query by identifying all possible complete paths. This spans all recognized elements of the query as well as intermediate elements in this graph to complete the path, and finally evaluates them. When ambiguity (multiple paths) exists, users are engaged in dialogue in determining the correct path. Moreover, users are engaged in dialogue in evaluating the result of the query and acquiring new keywords. These interactions with users are denoted as learning because their outcomes become new cases and keywords added to the reference dictionary to further improve effectiveness and efficiency of the system.

1. A Basic Graph Model of the Reference Dictionary

A basic graph model of the reference dictionary is designed to serve three purposes: (1) to include all possible interpretations for a natural language query suitable for evaluation, (2) to provide a basis for evaluation (resolution of ambiguity), and (3) to support learning. It integrates four resource layers (database values, information models, keywords, and cases) into a single graph model. In this graph, therefore, every element can refer to all related elements.

The design adopts the entity-relationship data model as a conceptual model because it is both sufficient for modeling the semantics of database objects and other database models can be translated into it. Therefore, in this graph, vertices constitute an entity or a relationship (an associative integrity constraint) and edges are connections based on their relationship constraints.

The design follows three steps. The first step models database objects as a database graph. The second step models indirect references to these objects. The final step models additional resources for evaluation.

1.1 A Database graph

Given S, R, A, and D respectively are the finite sets of entities, relationships, attributes, and values; and $S \cup R \cup A \cup D$ is a set of enterprise database objects (O). A database graph is a graph <V, E> where V=O, X=S∪R, Y=S∪R∪A and E⊆(X×Y)∪(A×D). E satisfies one of the following properties:
  (1) For all a∈A, if a is an attribute of x∈X, then edge {x, a}∈E.
  (2) For all r∈R, if r represents a referential or an existence integrity constraint between $s_1$ and $s_2$∈S, then edge {$s_1$, $s_2$}∈E.
  (3) For all r∈R, if r represents an associative integrity constraint between $s_1$ and $s_2$∈S, then edges {r, $s_1$} and {r, $s_2$}∈E.
  (4) For all d∈D, if d is a value of a∈A, then edge {a, d}∈E.

1.2 Indirect References to Database Objects

Indirect references to database objects are three extensions of the database graph as follows.
  (1) Given H is an entity set of high-level hierarchical objects, V=O∪H, and E⊆(X×Y)∪(A×D)∪(H×(H∪Y)). Edges (H×(H∪Y)) satisfy the following properties:
    (1.1.) For all $h_1$ and $h_2$∈H, if $h_1$ is part of $h_2$, then edge {$h_1$, $h_2$}∈E.
    (1.2.) For all h∈H, if h is described by {$a_1$, $a_2$, ..., $a_n$} for $a_i$∈A, i=1, ..., n; then edges {h, $a_1$}, {h, $a_2$}, ..., {h, $a_n$}∈E;
    (1.3.) For all h∈H, if h is described by {$x_1$, $x_2$, ..., $x_n$} for $x_i$∈X, i=1, ..., n; then edges {h, $x_1$}, {h, $x_2$}, ..., {h, $x_n$}∈E.
  (2) Given F is an entity set of operations (such as formulas and graphic presentations) upon a set of attributes, M=O∪H∪F, V=M, and E⊆(X×Y)∪(A×D)∪(H×(H∪Y))∪(A×F). Edges (A×F) satisfy the property: for all f∈F, if f is computed from {$a_1$, $a_2$, ..., $a_n$} for $a_i$∈A, i=1, ..., n; then edges {f, $a_1$}, {f, $a_2$}, ..., {f, $a_n$}∈E
  (3) Given K is an entity set of keywords that refers to an element of M, V=M∪K, and E⊆(X×Y)∪(A×D)∪(H×(H∪Y))∪(A×F)∪(K×M). Edges (K×M) satisfy the property: for all m∈M, if $k_1$, $k_2$, ..., $k_n$ for $k_i$∈K, i=1, ..., n refer to m; then edges {m, $k_1$}, {m, $k_2$}, ..., {m, $k_n$}∈E.

1.3 Additional Resources for Evaluation

Additional resources for evaluation are three extensions of the graph in Section 1.2 above as follows.
  (1) Given T is an associative relationship set of contextual knowledge among elements of H, V=M∪K∪T, and E⊆(X×Y)∪(A×D)∪((H∪T)×(H∪Y∪T))∪(A×F)∪(K×M). Edges ((H∪T)×(H∪Y∪T)) satisfy the property: for all t∈T, if t represents associations among $h_1$, $h_2$, ..., $h_n$ for $h_i$∈H, i=1, ..., n; then edges {t, $h_1$}, {t, $h_2$}, ..., {t, $h_n$}∈E.

(2) Given U is an entity set of user profiles, P is an associative relationship set of elements of U and H, V=M∪K∪T∪U∪P, and E ⊆(X×Y)∪(A×D)∪((H∪T)×(H∪Y∪T))∪(A×F) ∪(K×M)∪((H∪P)×(U∪P)). Edges ((H∪P)×(U∪P)) satisfy the property: for all p∈P, if p represents an association between h∈H and u∈U, then edges {h, p} and {u, p}∈E.

(3) Given C is a entity set of cases and Z is an associative relationship set of elements of C and M, V=M∪K∪T∪U∪P∪C∪Z and E ⊆(X×Y)∪(A×D)∪((H∪T)×(H∪Y∪T))∪(A×F)∪(K×M)∪((H∪P)×(U∪P))∪((M∪Z)×(C∪Z)). Edges ((M∪Z)×(C∪Z)) satisfy the property: for all z∈Z, if z represents association between c∈C and $\{m_1, m_2, \ldots, m_n\}$ for $m_i \in M$, i=1, ..., n; then edges $\{c, m_1\}$, $\{c, m_2\}, \ldots, \{c, m_n\} \in E$ 2. A Search and Learn Process An ambiguous (incomplete) input is an input that corresponds to more than one interpretation (represented by more than one path in the graph defined in Section 1.1 and Section 1.2(1), which this graph denotes as G). The ambiguity stems from a meaningful term (a word or phrase) in the input which refers to more than one element in the graph G. Therefore, there exists more than one target graph for each ambiguous input. A target graph is a subset of the set of vertices in the graph G and its vertices corresponds to each recognized term of the input. Each of these target graphs may determine more than one query graph. A query graph is the connected graph of a target graph. It represents the complete path for each interpretation. A complete path is the path that spans all vertices of its target graph and may include intermediate vertices in the graph G to complete it. An unambiguous (complete) input is the input that corresponds to a unique complete path in the graph G.

The basic idea of search is to enumerate all possible paths (query graphs) and to evaluate (rank) them to determine the best path (interpretation) for a query. In the above analysis, however, there are two sources of ambiguity: multiple meanings of a term in the input and multiple paths determined from a target graph. These sources can lead to a huge number of complete paths in the graph G. So, it is inefficient to generate all of these possible paths. The primary goal is to place correctness first while generating the minimal set of possible complete paths (i.e., correctness and efficiency are our goals). In particular, the goal is to determine the minimal set of candidate interpretations (minimize number of possible complete paths) without excluding any meanings of terms from the input and suggesting the best interpretation for the user.

To minimize a number of possible paths under the correctness constraint, we have to minimize a number of terms representing the input and minimize a number of enumerated target graphs. Domain-independent heuristics based on object hierarchy in G are used to minimize the number of terms. The number of target graphs can be minimized in two steps. In the first step, consistency constraints (such as functional dependencies, and business rules) in the graph G and its extension defined in Section 1.3(1) are used to eliminate the target graphs with a conflicting selection condition. The second step minimizes the number of vertices for each target graph and eliminates the redundant target graphs by using domain-independent heuristics based on the object hierarchy defined in the graph G.

The next task is to obtain a minimal set of query graphs corresponding to the obtained set of target graphs. The query graph of a target graph is the connected graph that spans all vertices of the target graph and intermediate vertices of G to connect them. In addition, the number of connections is minimal. This bases on the observation that the semantically related terms tend to be near each other in G. Note that this problem can be modeled as a discrete optimization problem to determine the shortest path connecting all elements of a target graph. If there exists more than one target graph corresponding to a query, the next query graph will be generated based on the accumulated knowledge from the generation of the past query graphs. However, the new set of query graphs may contain identical elements. These can be reduced to obtain a minimal set of query graphs.

The last task of the search process is to evaluate candidate query graphs (interpretations) to suggest the best interpretation for the user. This task follows three steps. The first step uses heuristics to measure the semantic relatedness of term meanings based on the same observations used in generating query graphs. Thus, the query graphs with the shortest path length (minimum number of edges) have the greatest semantic relatedness. The next two steps are employed if the result of the previous step is ambiguous. The second step identifies the solution based on high-level object-usage history of users (the extension of graph G defined in 1.3(2)). The last step identifies the solution based on the past cases (the extension of graph G defined in 1.3(3)).

However, the above process may still lead to three results: no interpretation, one interpretation, and multiple interpretations. In case of multiple interpretations, the system will resolve this ambiguity prior to presenting candidate interpretations back to the user to choose the correct one. The result of the best interpretation (either an interpretation suggested by the system or user's own chosen interpretation) is that which is evaluated by the user. If the user does not accept the result or there is no interpretation of the query, the system will engage the user in a dialogue relying on the learning mechanism.

A detailed exemplary algorithm following the above basic logic is outlined below.

Given an input ($I_0$) is an ordered n-tuple $(w_1, w_2, \ldots, w_n)$ of words, i.e., $I_0=(w_1, w_2, \ldots, w_n)$, where n is the number of words in a natural language query.

Step 1: Identify all meaningful words or phrases in the input and their meanings (elements in G).

Step 1.1: Determine a set of all meaningful words and phrases in the input (we denote this set as $I_1$) such that these words and phrases are possibly elements of the graph G and its extensions defined in Section 3.1.2(2) and (3). Therefore, we have $I_1=(t_1, t_2, \ldots, t_k)$ such that k≦n, where k is the number of terms formed from n words of $I_0$. If there is no meaningful word or phrase in the query (k=0), then go to the learning mechanism to acquire new keywords and redo this step.

Step 1.2: Determine an ordered k-tuple $M_0=(S_1, S_2, \ldots, S_k)$ such that $S_i$ is a set of set of meanings of its correspondent $t_i \in I_1$ where i=1, ..., k; and $S_i$ is determined based on how they are used in G (i.e., all elements $I_1$ that refer to elements of the graph defined in Section 3.1.2(2) and (3) are mapped into G).

Step 1.3: Determine $M_1$ and $I_2$ such that $M_1$ represents the minimal meaning of $M_0$ ($M_1$ contains no redundant sets of set of meanings) and I2 corresponds to $M_1$ (i.e., $M_1=(S_1, S_2, \ldots, S_{k^*}{}^*)$ and $I_2=(t_1, t_2, \ldots, t_{k^*}{}^*)$ where $k^*$ is a minimal k and $k^* \leq k$).

Step 2: Determine all possible and complete paths (interpretations) implied by $I_2$.

Step 2.1: Determine the set of ordered pairs ($TG_i$, $<SC>_{TGi}$), we denote this set as $TG_{M1}$, such that $TG_i$ is a target graph, i=1, . . . , n, n is the number of enumerated target graphs determined from $M_1$, and $<SC>_{TGi}$ is a selection condition of $TG_i$; such that for all elements of $TG_i$ in vertices D of the graph G:

If there exist $d_1, \ldots , d_m$ in the same element of A (denoted by a) in the graph G (defined in Section 3.1.1), then add $a=d_1 \vee \ldots \vee a=d_m$ to $<SC>_{TGi}$.

If there exist $d_1, \ldots , d_k$ in the different elements of A ($a_1, \ldots , a_k$) in the graph G, then add $a_1=d_1 \wedge \ldots \wedge a_m=d_m$ to $<SC>_{TGi}$.

Step 2.2: Determine the set of consistent target graphs ($CTG_{M1}$) such that for each $TG_i \in CTG_{M1}$, its selection condition $<SC>_{TGi}$ does not conflict any of consistency constraints in defined in the graph of G and its extension in Section 3.1.3(1), i=1, . . . , n*, n*≦n, and n is defined in Step 2.1. If there is no consistent target graph ($CTG_{M1}=\{\ \}$), then go to the learning mechanism.

Step 2.3: Determine the minimal elements for each $TG \in CTG_{M1}$ such that for all elements $v_i$ and $v_j$ in TG where i, j=1, . . . , k*, i≠j and k* is defined in step 1.3; there does not exist $v_i$ such that $v_i \in v_j$.

Step 2.4: Determine the minimal set for $CTG_{M1}$ (we denote this set as $MTG_{M1}$) such that for all $TG_i$ and $TG_j$ in $MTG_{M1}$ that $<SC>_{TGi}=<SC>_{TGj}$ where i, j=1, . . . , n, i≠j, n≦n, and n* is defined in step 2.2; there does not exist TGi such that $TG_i \subseteq TG_j$.

Step 2.5: Determine the set of query graphs for $MTG_{M1}$ (we denote this set as $QG_{M1}$) such that the query graph for each target graph TG in $MTG_{M1}$ QG(TG)=<VQ, EQ> is the connected graph that $TG \subseteq VQ$, edges EQ are elements of edges G, and the number of EQ is minimal. Note that the QG(TG) can be obtained by using an optimization method. If there exists one query graph, then go to Step 4.

Step 2.6: Determine the minimal set of query graphs for $QG_{M1}$ (we denote this set as $MQG_{M1}$) such that for all $QG_i$ and $QG_j$ in $QG_{M1}$ that $<SC>_{QGi}=<SC>_{QGj}$ where i, j=1, . . . , n*, i≠j, n*≦n, and n is defined in step 2.4; there does not exist $QG_j$ such that $QG_i=QG_j$. If there exists one interpretation (n***=1) in $MQG_{M1}$, then go to Step 4.

Step 3: Evaluate candidate interpretations (query graphs).

Step 3.1: Identify the set of minimum-length query graphs (we denote this set as $LQG_{M1}$) such that every QG in $LQG_{M1}$ is an element of $MQG_{M1}$ and the QG is the minimum path-length query graph among a query graph $QG_i \in MQG_{M1}$ where i=1, . . . , n*, n*≦n, and n is defined in step 2.4. If there exists one interpretation, then go to Step 4.

Step 3.2: Determine the set of the most likely interpretation (when ambiguity exists as the result of Step 3.1) such that for all QG in this set its measure of similarity between its set of high-level objects (HQG) of QG in $LQG_{M1}$ and a set of high-level object-usage of the user ($H_U$) is maximal. If there exists one best interpretation based on this measure, then go to Step 4.

Step 3.3: Determine the set of the most likely interpretation (when ambiguity exists as the result of Step 3.2) such that for all QG in this set its measure of similarity between the $I_2$ and a set of terms described cases is maximal and the case solution is the most similar to the query graph QG. If there exists multiple interpretations, then ask users to choose the correct interpretation.

Step 4: Map the query graph to the database query language, resolve semantic ambiguity result from the query processing, obtain the results of query and confirm them with the user.

Step 4.1: Determine the database query language (DBL) such that the DBL represents the final interpretation (QG, $<SC>_{QG}$).

Step 4.2: Determine the best semantics of DBL (if there exists semantic ambiguity from the query processing) such that the measure of similarity between its correspondent database graph and the case is maximal and the best semantics of DBL is the solution of the case. If using cases cannot resolve this problem, then ask users to choose the correct one.

Step 4.3: Obtain the results of query and confirm them with the user. If the user accepts them, the learned lessons will be appropriately updated as new keywords (the extension of graph G defined in Section 3.1.2(3)) and cases (the extension of graph G defined in Section 1.3(3)). Otherwise, the system will engage the user in dialogue in the learning mechanism to acquire new keywords and then go to Step 1.

Note that this analysis applies to the problem of natural language interfaces for enterprise databases in general. Therefore, each step allows for a wide range of possible strategies and algorithms to implement it.

While various embodiments of the present invention have been described above, it should be understood that they have been presented by way of example only, and not limitation. Thus, the breadth and scope of the present invention are not limited by any of the above exemplary embodiments, but are defined only in accordance with the following claims and their equivalents.

The invention claimed is:

1. A method for processing a natural language input provided by a user, the method comprising:
   providing a natural language query input by the user;
   performing, based on the input, without augmentation, a search of one or more language-based databases including at least one metadata database comprising at least one of a group of information types comprising:
   case information;
   keywords;
   information models; and
   database values;
   providing, through a user interface, a result of the search to the user;
   identifying, for the one or more language-based databases, a finite number of database objects; and
   determining a plurality of combinations of the finite number of database objects.

2. The method according to claim 1, further comprising a step of mapping the natural language query to the plurality of combinations.

3. The method according to claim 2, wherein the step of mapping comprises steps of:
   identifying keywords in the natural language query; and
   relating the keywords to the plurality of combinations.

4. The method according to claim 2, further comprising a step of determining a reference dictionary comprising:
   case information;
   keywords;
   information models; and
   database values.

5. The method according to claim 2, wherein the step of mapping further comprises resolving ambiguity between the keywords and the plurality of combinations.

6. The method according to claim 5, wherein the step of resolving includes determining an optimal interpretation of the natural language query using at least one of a group comprising rules and heuristics.

7. The method of claim 1 wherein providing a natural language query input by the user includes providing a natural language query input by the user without constraining said query grammatically or structurally.

8. The method of claim 7 wherein the natural language query comprises a sentence, multiple sentences, a non-sentence word group or a combination thereof.

9. A computer-implemented method for processing a natural language input comprising:
   receiving a natural language input;
   providing from said natural language input a plurality of language-based database objects;
   identifying a finite number of permutations of the plurality of database objects, the database objects being stored in a metadata database comprising at least one of a group of information comprising
   case information,
   keywords,
   information models, and
   database values; and
   interpreting at least one of the permutations to provide determination of a result of the natural language input.

10. The method according to claim 9, wherein the step of providing a plurality of database objects includes providing at least one of the group comprising data types, data instances, and database computational operators.

11. The method according to claim 10, wherein the step of interpreting includes mapping the at least one of the permutations to a database query.

12. The method according to claim 11, wherein the database query is formulated in a structured query language (SQL) query.

13. The method according to claim 9, wherein one or more permutations are eliminated.

14. The method according to claim 9, further comprising:
   providing a reference dictionary comprising cases, keywords, information models, graphics, and database values;
   identifying, in the natural language input, a plurality of elements that belong to the reference dictionary;
   determining complete paths that are implied by the plurality of elements that span elements of the natural language input and which belong to the graphics of the reference dictionary.

15. The method according to claim 14, including determining a path that includes elements of at least the informational models and database values.

16. The method according to claim 14, further comprising:
   providing rules and heuristics for searching; and
   determining an optimum permutation based on the rules and heuristics.

17. The method according to claim 14, further comprising adding, as a result of user input, new cases and keywords to the reference dictionary.

18. The method according to claim 9, further comprising performing a search of a group of possible interpretations to determine an optimal interpretation of the natural language input.

19. The method according to claim 9, further comprising accepting the natural language input, wherein the action of accepting the natural language input accepts a free-format input.

20. The method according to claim 9, wherein of interpretation of natural language input is based on other than the results of analyzing syntax of the natural language query input.

21. The method according to claim 9, further comprising representing graphically elements of the metadata database.

* * * * *